United States Patent [19]
Wisler et al.

[11] Patent Number: 5,530,358
[45] Date of Patent: Jun. 25, 1996

[54] METHOD AND APPARATUS FOR MEASUREMENT-WHILE-DRILLING UTILIZING IMPROVED ANTENNAS

[75] Inventors: Macmillan M. Wisler, Kingwood; Larry W. Thompson, Willis; William C. Paluch, Houston, all of Tex.

[73] Assignee: Baker Hughes, Incorporated, Houston, Tex.

[21] Appl. No.: 187,417

[22] Filed: Jan. 25, 1994

[51] Int. Cl.⁶ .............................. G01V 3/10; H01Q 1/04; H01Q 7/08
[52] U.S. Cl. ...................... 324/338; 343/719; 343/789
[58] Field of Search ............................ 324/332, 333, 324/334, 335, 337, 338, 339, 340, 341, 345, 346, 349, 356, 369; 343/719, 788, 722, 872, 873; 175/40, 50

[56] References Cited

U.S. PATENT DOCUMENTS

| | | | |
|---|---|---|---|
| Re. 32,913 | 4/1989 | Clark | 324/338 |
| 3,273,152 | 9/1966 | Earp | 343/719 |
| 3,584,293 | 6/1971 | Lizuka | 324/5 |
| 4,312,003 | 1/1982 | Robbins, Jr. | 343/719 |
| 4,511,842 | 4/1985 | Moran et al. | 324/338 |
| 4,511,843 | 4/1983 | Thoraval | 324/338 |
| 4,578,675 | 3/1986 | MacLeod . | |
| 4,689,572 | 8/1987 | Clark | 324/341 |
| 4,697,190 | 9/1987 | Oswald | 343/719 |
| 4,766,442 | 8/1988 | Issenmann . | |
| 4,785,247 | 11/1988 | Meador et al. . | |
| 4,940,943 | 7/1990 | Bartel et al. . | |
| 5,014,071 | 5/1991 | King | 343/788 |
| 5,081,419 | 1/1992 | Meador et al. . | |
| 5,138,263 | 8/1992 | Towle | 324/334 |
| 5,157,331 | 10/1992 | Smith | 324/338 |
| 5,212,495 | 5/1993 | Winkel et al. . | |

FOREIGN PATENT DOCUMENTS

| | | |
|---|---|---|
| 0314573 | 3/1989 | France . |
| 0102091 | 7/1984 | United Kingdom . |
| 2217850 | 1/1989 | United Kingdom . |
| 2249180 | 4/1992 | United Kingdom . |

*Primary Examiner*—Sandra L. O'Shea
*Assistant Examiner*—Roger Phillips
*Attorney, Agent, or Firm*—Melvin A. Hunn

[57] ABSTRACT

A method and apparatus is provided for measurement-while-drilling utilizing improved antennas. An elongated tubular member is provided with an outer peripheral surface having a contoured portion defining a plurality of discrete communication regions of reduced radial dimension. An antenna pathway is defined in the elongated member substantially transverse to the plurality of discrete communication regions. An antenna member is partially disposed in the antenna pathway with portions of the antenna member extending out of the elongated member at the plurality of discrete communication regions to facilitate communication of electromagnetic energy. In a reception mode of operation, the antenna member detects electromagnetic energy in the wellbore and generates a current corresponding thereto. If operated in a transmission mode of operation, the antenna member emits electromagnetic energy in the wellbore in response to an energizing current. Preferably, the plurality of discrete communication regions are circumferentially disposed about the elongated member. Means is provided for preferentially communicating electromagnetic energy with particular portions of the antenna member which are disposed in the plurality of discrete communication regions. In one particular embodiment, a plurality of electrically-operable magnetic circuit elements are provided for communicating with particular ones of the plurality of discrete communication regions of the antenna member, for altering antenna gain in response to at least one control signal.

72 Claims, 25 Drawing Sheets

SECTION A-A

SECTION C-C

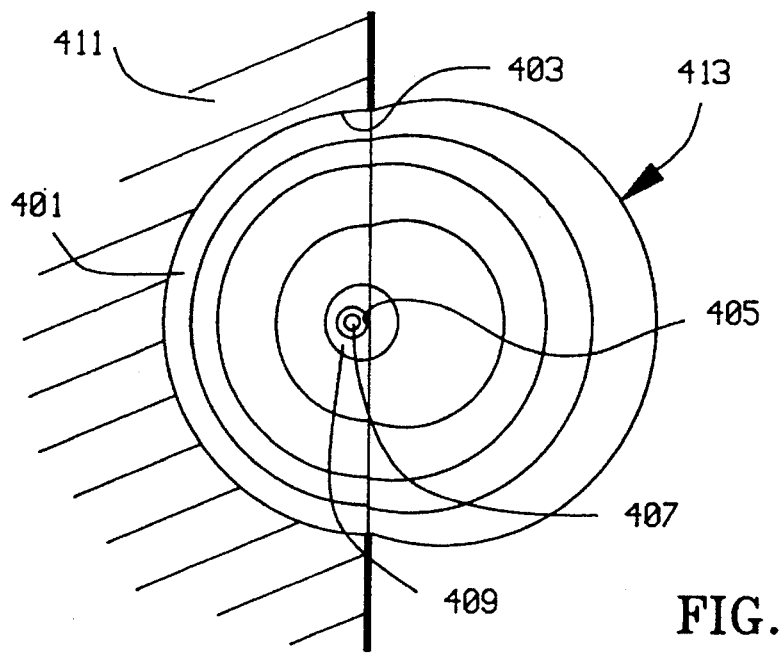
FIG. 14A
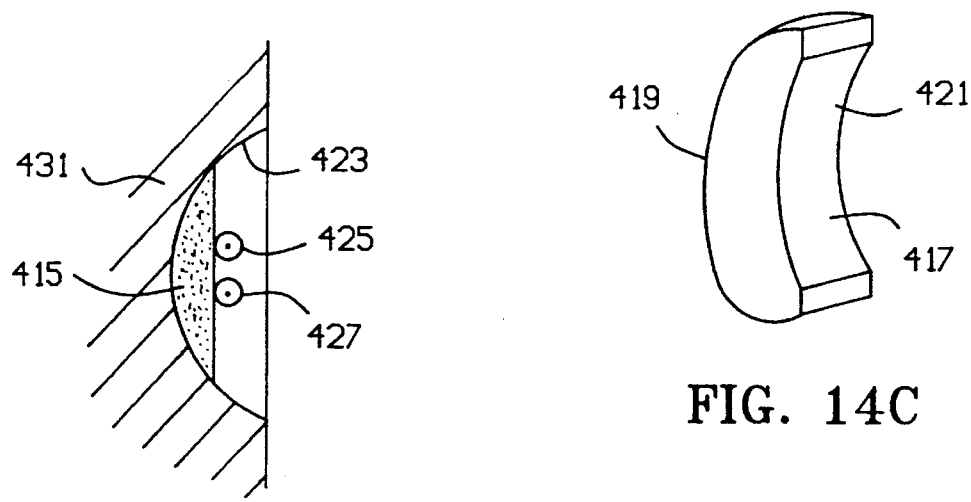
FIG. 14B
FIG. 14C
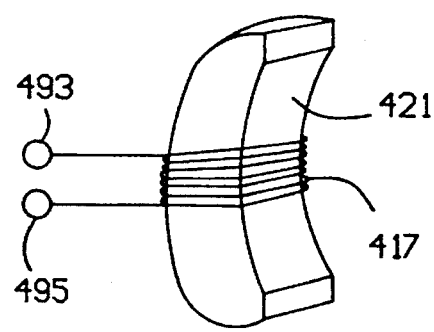
FIG. 14D

| MODES | AZIMUTHAL PREFERENCE | QUADRANT | DURATION |
|---|---|---|---|
| NO 1 | 0-90 DEGREES | I | $X_1$ |
| NO 2 | 90-180 DEGREES | II | $X_2$ |
| NO 3 | 180-270 DEGREES | III | $X_3$ |
| NO 4 | 270-360 DEGREES | IV | $X_4$ |
| NO 5 | ROTATION (EVEN) | I-IV | EVEN $X_1, X_2, X_3, X_4$ |
| NO 6 | ROTATION (BIASED) | I-IV | $X_1, X_2, X_4$ $Y_3$ |

METHOD AND APPARATUS FOR MEASUREMENT-WHILE-DRILLING UTILIZING IMPROVED ANTENNAS

BACKGROUND OF THE INVENTION

1. Field of the Invention

The present invention relates in general to measurement-while-drilling systems, and in particular to improved antennas for use in measurement-while-drilling systems.

2. Description of the Prior Art

The efficient and problem-free communication of data has been one long-standing goal of the oil and gas industry. The communication of data is particularly important during drilling operations, but is also of interest in completion and production operations. Two principal techniques exist for efficient and reliable communication: the communication of data utilizing a mud pulse telemetry system, and the communication of data utilizing electromagnetic transmissions. Of course, high quality antennas are required in order to transmit and receive electromagnetic energy at a deep subterranean location. Even for other transmission systems, such as the mud pulse telemetry data transmission system, it turns out that reliable antennas are also desirable, due principally to the fact that logging operations are frequently performed during drilling operations, utilizing antennas to transmit interrogating electromagnetic waves into the borehole and surrounding formation, and then utilizing antennas to detect the amplitude attenuation or phase shift of the interrogating electromagnetic wave.

Antennas, whether used for the electromagnetic communication of data or for the transmission and reception of interrogating fields during logging operations, are rather delicate devices which cannot be too heavily shielded or they will not be able to perform their functions. But they are so delicate that they cannot be exposed to wellbore conditions, particularly during drilling operations, without substantial risk of harm. Consequently, most art antenna constructions utilize solid wellbore tubulars, such as drill collar tubulars and drill pipe tubulars, to form a housing which protects the antenna from damage due to the corrosive fluids, high pressures, and high temperatures frequently encountered in wellbores particularly during drilling operations. The most common prior art technique requires that a portion of the tubular be "necked-down" during milling and/or machining operations by radially reducing the tubular at a particular location to provide a rather deep and wide groove. Typically, a layer of cushioning and electrically-insulating material is provided in the groove, and the antenna windings are wound about the tubular at the position of the groove to protect the antenna from physical damage to allow the communication of electromagnetic fields between the antenna windings and the borehole and surrounding formation, a slotted sleeve was typically provided, and secured in position over the antenna windings provided within the necked-down portion of the tubular member.

For the most part, this type of construction provided a satisfactory result; however, the wellbore tubular is weakened in the region of the necked-down portion, to an extent that may not be acceptable in particularly difficult drilling operations. Additionally, since the antenna windings are disposed beneath at least one substantial layer of steel presented by the slotted sleeve, additional electrical energy is expended in order to provide for adequate signal levels.

SUMMARY OF THE INVENTION

It is one objective of the present invention to provide an antenna assembly for use in a wellbore which protects the antenna itself from the harsh wellbore environment, but which does so without significantly jeopardizing the structural integrity and load bearing ability of the wellbore tubular which carries the antenna assembly.

It is another objective of the present invention to provide an improved antenna assembly in which an antenna is housed within an antenna pathway which is defined in the body of the material which forms a wellbore tubular member. A contoured portion is provided on the outer peripheral surface of the tubular defining a plurality of discrete communication regions of reduced radial dimensions. The antenna member is disposed in an antenna pathway which is substantially traverse to the plurality of discrete communication regions, with portions of the antenna member extending out of the tubular body at the discrete communication regions to facilitate communication of electromagnetic energy.

It is yet another objective of the present invention to provide an improved antenna assembly for use in a wellbore for communicating electromagnetic energy which includes an antenna pathway defined in an elongated member, and an antenna member at least partially disposed in the antenna pathway with portions of the antenna member defining a plurality of discrete communication regions which facilitate communication of electromagnetic energy. A plurality of electrically-operably magnetic circuit elements are provided for communication with particular ones of the plurality of discrete communication regions of the antenna member, for altering the antenna gain at particular ones of the plurality of discrete communication regions in response to at least one control signal.

It is yet another objective of the present invention to provide a measurement-while-drilling apparatus for use in drilling operations to interrogate a borehole and surrounding formation, which includes transmitting and receiving antennas which are spaced apart along a tubular member and utilized to generate and receive an interrogating electromagnetic signal. At least one antenna assembly includes an antenna member disposed in an antenna pathway which is at least in part disposed within the tubular member, and a focus means for preferentially communicating electromagnetic energy between at least a portion of the antenna member and the borehole and surrounding formation.

It is still another objective of the present invention to provide a method of manufacturing an antenna assembly for use in a wellbore for communicating electromagnetic energy, which includes the steps of (a) providing an elongated member with an outer peripheral surface having a contoured portion defining a plurality of discrete communication regions of reduced radial dimension, (b) forming an antenna pathway in the elongated member substantially transverse to the plurality of discrete communication regions, and (c) disposing an antenna member at least partially in the antenna pathway with portions of the antenna member extending out of the elongated member at the plurality of discrete communication regions to facilitate communication of electromagnetic energy.

It is yet another objective of the present invention to provide a method of interrogating a borehole and surrounding formation with an electromagnetic interrogating field, which includes the steps of (a) providing an elongated member with an antenna pathway defined therein and an antenna member at least partially disposed in the antenna pathway, with portions of the antenna member defining a plurality of discrete communication regions, and (b) preferentially communicating the electromagnetic interrogating field between the antenna member and the borehole and surrounding formation at particular ones of the portions of the antenna member.

These and other objectives are achieved as is now described. When characterized as an antenna assembly, the present invention is directed to an antenna assembly for use in a wellbore for communicating electromagnetic energy, and comprises a plurality of components which cooperate together. An elongated member is provided, preferably with an outer peripheral surface having a contoured portion defining a plurality of discrete communication regions of reduced radial dimension. An antenna pathway is defined in the elongated member, and an antenna member is at least partially disposed in the antenna pathway, with portions of the antenna member defining a plurality of discrete communication sections to facilitate communication of electromagnetic energy. The improved antenna assembly is operable in at least one of (1) a reception mode of operation and (2) a transmission mode of operation. In the reception mode of operation, the antenna member detects electromagnetic energy in the wellbore and surrounding formation and generates a current corresponding thereto. In the transmission mode of operation, the antenna member emits electromagnetic energy in the wellbore and surrounding formation in response to an energizing current.

In the preferred embodiment of the present invention, the elongated member comprises a tubular member which is adapted for coupling in a selected position within a drillstring during drilling operations, and includes an inner peripheral surface defining a central bore, an outer peripheral surface, and a tubular body defined between the inner peripheral surface and the outer peripheral surface. The antenna pathway is defined within the tubular body of the tubular member, and is preferably substantially circular in configuration. The tubular member preferably includes a contoured portion on its outer peripheral surface, which defines a plurality of interrogation regions having a reduced radial dimension. The antenna pathway traverses the plurality of interrogation regions of the contoured portion, thus allowing an antenna member which is disposed within the antenna pathway to extend out of the tubular body of the tubular member at each of the plurality of interrogation regions to facilitate communication of electromagnetic energy between the antenna member and the borehole and surrounding formation. Since the tubular member is typically formed of steel which substantially impedes the communication of electromagnetic energy between the antenna member and the borehole and surrounding formation, communication of electromagnetic energy between the antenna member and the borehole and surrounding formation is accomplished at the discrete interrogation regions of the contoured portion. Preferably, the plurality of interrogation regions are located at preselected azimuthal locations on the outer periphery of the tubular member. Still more particularly, in one particular embodiment, the plurality of interrogation regions comprise axial slots which are formed in the tubular member, and which extend through an antenna pathway which is positioned within the tubular body intermediate the inner peripheral surface and the outer peripheral surface. The positioning of the interrogation regions along the outer periphery of the tubular member can provide for either symmetrical communication of electromagnetic energy between the antenna and the borehole and surrounding formation, or asymmetrical communication of the electromagnetic energy between the antenna member and the borehole and surrounding formation.

In one particular embodiment of the present invention, a filler material is provided, which is positionable within at least a portion of particular ones of the interrogation regions. The filler material has a magnetic reluctance which differs from that of the tubular member, and thus can boost communication of electromagnetic energy at particular ones of the plurality of interrogation regions over others of the plurality of interrogation regions. By selectively placing the filler material, an antenna can be configured to provide either symmetrical communication of electromagnetic energy between the antenna member and the surrounding formation, or an asymmetrical communication of electromagnetic energy between the antenna member and the borehole and surrounding formation.

In another particular embodiment of the present invention, a plurality of electrically-operable magnetic circuit elements are provided for communicating with particular ones of the plurality of discrete communication regions of an antenna member, for altering antenna gain in response to at least one control signal. A controller member is also provided for providing the control signal to the electrically-operable magnetic circuit elements to alter their antenna gain in a predetermined manner in response to controller program instructions. Preferably, the electrically-operable magnetic circuit elements comprise a core of magnetically permeable material, with a control winding disposed over at least a portion of the core. The electrically-operable magnetic circuit elements are adapted in size and shape to be inserted within the discrete communication regions of the antenna assembly. When no current is provided in the control windings, the core has a magnetic permeability greater than that of either the steel material of the tubular member or the borehole and surrounding formation, and thus provides a comparatively low magnetic reluctance for electromagnetic flux; however, a control current may be applied to the control windings to either partially or completely magnetically saturate the core, thus changing it from a comparatively low reluctance flux pathway to a relatively high reluctance flux pathway.

The present invention may also be characterized as a method of manufacturing an antenna assembly, and includes a number of method steps. A substantially cylindrical tubular member is provided. An antenna member is also provided. A circumferential groove is cut or machined in an exterior surface of the substantially cylindrical tubular member. A pathway portion within the circumferential groove is shielded using either a small tubular conduit or a strip of metallic material. The circumferential groove is then filled with a binding material, except for the pathway portion. Preferably, the binding material is sufficiently strong to restore the cylindrical tubular member to its original condition (that is, prior to cutting on the circumferential groove). In accordance with the present invention, this may be accomplished by welding operations. Then, a plurality of cavities are cut in the exterior surface of the substantially cylindrical tubular member, to a depth sufficient to communicate with the pathway portion, and an antenna member is placed in the pathway portion.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5, 6, 7, and 8 provide detail views of the tubular of FIG. 4a;

FIGS. 14a through 14d provide views of various filler inserts which can be utilized in the present invention;

DETAILED DESCRIPTION OF THE INVENTION

Figure 1A:
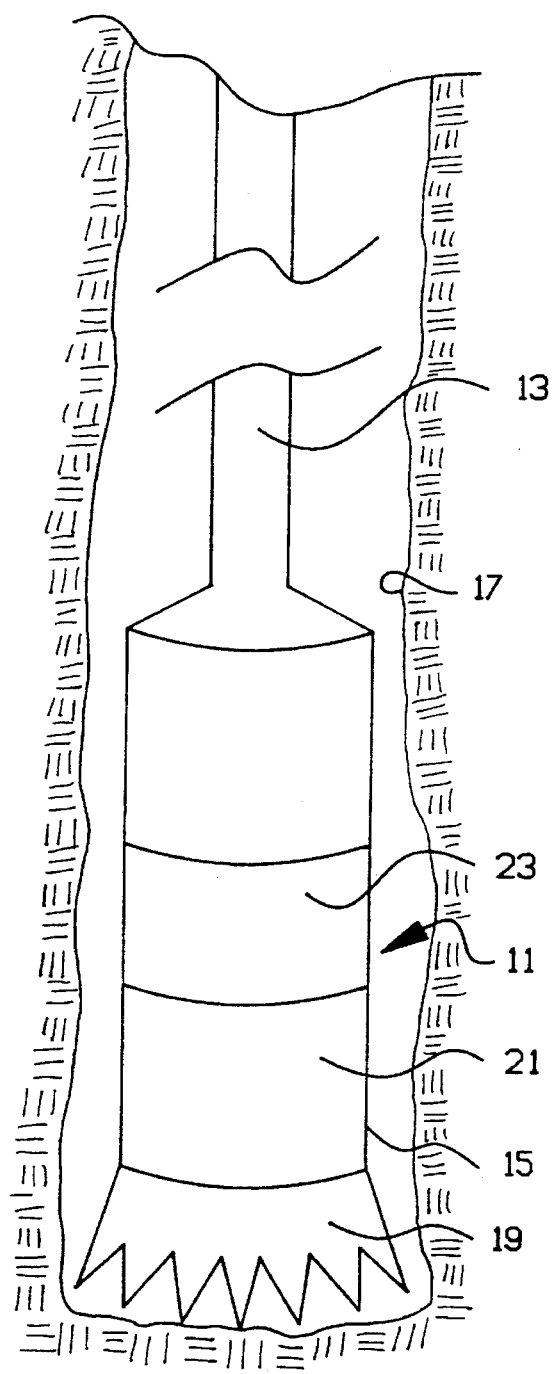
FIGS. 1a and 1b provide simplified views of a measurement-while-drilling system utilizing an improved antenna in accordance with the present invention.

FIG. 1a depicts in simplified form drillstring 11 which is disposed within wellbore 17. Typically, drillstring 11 includes a very long section of drill pipe 13 and a relatively short section of drill collar 15, which is larger in diameter than the drill pipe section. Rockbit 19 is provided at the lowermost section of drillstring 11 and is utilized to disintegrate the earth formation as drillstring 11 is rotated through the use of surface equipment including a rotary drilling rig. Alternatively, drillstring 11 need not be rotated if a turbine and drive mechanism are provided within the drill collar section 15 to rotate rockbit 19. Drill collar section 15 includes formation logging subassembly 21 and mud pulse telemetry subassembly 23. The logging subassembly 21 is utilized to perform electric logging operations during drilling operations, including periods of drilling activity and quiescent periods between intervals of drilling. Logging subassembly 21 includes a plurality of transmitters and a plurality of receivers which are utilized to generate interrogating signals which are propagated into the wellbore and surrounding formation and to detect the response of the wellbore and surrounding formation to the interrogating signal. Two of the most common measurements include measurement of the attenuation and phase shift of an interrogating electromagnetic signal which is emanated from a transmitting antenna and detected at two or more receiving antennas.

Figure 1B:
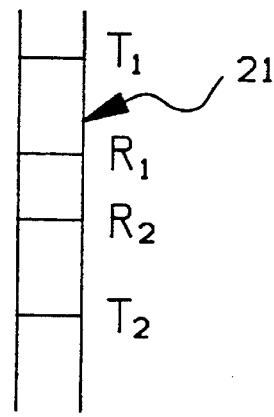

FIG. 1b provides a simplified and schematic view of the antenna placement in logging subassembly 21. Note that receiving antennas R1, R2 are disposed intermediate upper and lower transmitting antennas T1, T2. In operation, upper transmitting antenna T1 transmits an interrogating electromagnetic signal which propagates through the wellbore and surrounding formation. Receiving antennas R1, R2 are utilized to detect the interrogating electromagnetic signal, and provide a measure of the amplitude attenuation (between the locations of R1 and R2) and phase shift (between the locations of R1 and R2). Then, the lower transmitter T2 generates an interrogating electromagnetic signal which is propagated through the wellbore and surrounding formation and detected at receiving antennas R1, R2. Once again, the measurements taken by receiving antennas R1, R2 are utilized to calculate amplitude attenuation and phase shift for the interrogating electromagnetic signal.

Figure 2:
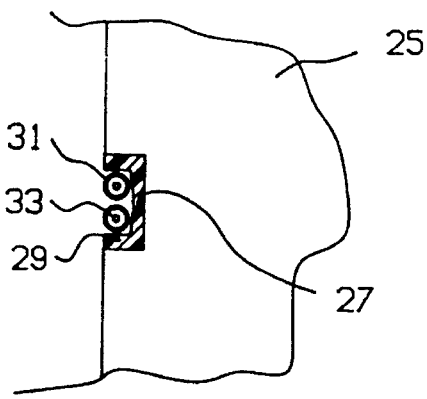
FIG. 2 is a view of a prior art antenna construction.
Figure 3:
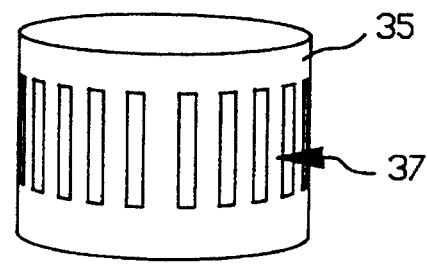
FIG. 3 is a view of a prior art slotted mask which may be utilized with the prior art antenna construction of FIG. 2.

FIGS. 2 and 3 provide a simplified view of a prior art antenna assembly. As is shown in FIG. 2, circumferential groove 27 is formed in tubular member 25. A layer of shield material 29 is disposed within groove 27 to electrically insulate, and mechanically isolate, antennas 31, 33 which are also carried within circumferential groove 27. Guard sleeve 53 of FIG. 3 may be placed over circumferential groove 27 of tubular member 25 to somewhat mechanically electrostatically isolate antennas 31, 33 from wellbore conditions. Axial slots 37 are provided within guard sleeve 35 to allow for the communication of electromagnetic energy between circumferential groove 27 and the wellbore and surrounding formation.

Circumferential groove 27 which is machined into tubular member 25 can significantly reduce the structural integrity of tubular member 25. This is especially true as the oil and gas industry is attempting to drill and log ever more narrow boreholes. For example, early efforts are underway to utilize coiled tubing in lieu of the larger-diameter drill collars and drill pipe tubulars for side-tracked wellbores. As the diameter and thickness of the tubulars utilized to drill and log wellbores decreases, the reduction in strength and associated risk posed by necking-down portions of the tubular increases.

Figure 4A:
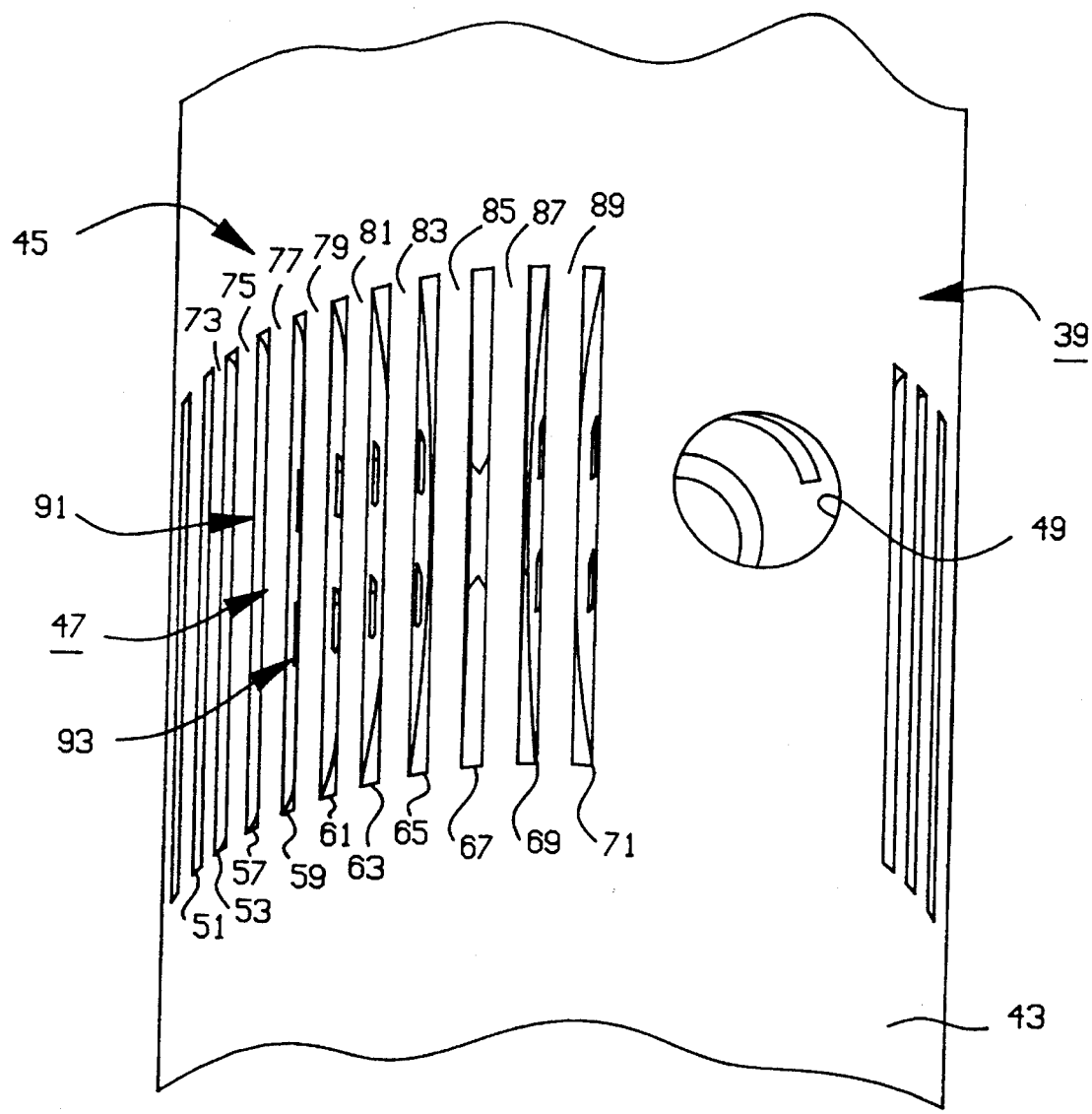
FIGS. 4a and 4b provide views of two tubular members constructed in accordance with the present invention, and adapted for receipt of antenna windings.
Figure 4B:
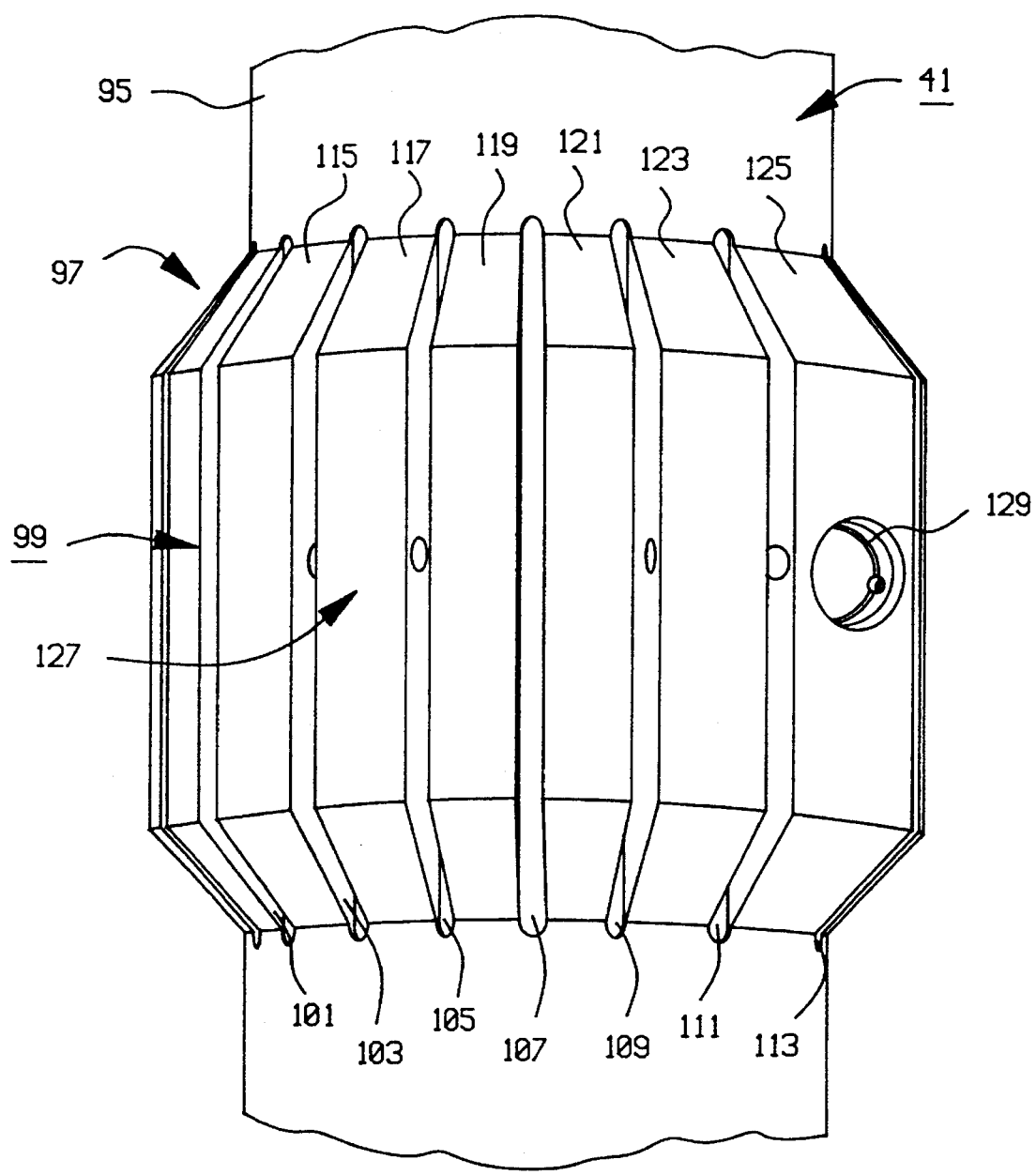

FIGS. 4a and 4b are perspective and fragmentary views of modified tubular 39 and modified tubular 41, in accordance with the present invention, which accommodate one or more antenna windings. As is shown in FIG. 4a, modified tubular 39 includes outer peripheral surface 43 which includes contoured portion 45 which includes a plurality of discrete communication regions 47 of reduced radial dimension. Preferably, as is shown, discrete communication regions 47 comprise a plurality of axial slots formed within modified tubular 39, which are spaced about outer peripheral surface 43 in a predetermined manner. As is shown in FIG. 4a, axial slots 51, 53, 57, 59, 61, 63, 65, 67, 69, and 71 define regions of reduced radial dimension, which are separated by land members 73, 75, 77, 79, 81, 83, 85, 87 and 89 of a radial dimension equal to that of outer peripheral surface 43 of modified tubular 39.

In FIG. 4a, two antenna pathways are defined in the body of the material which comprises modified tubular 39. Antenna pathways 91, 93 communicate with the discrete communication regions 47 defined by the axial slots. Both antenna pathway 91 and antenna pathway 93 are generally circular in shape, and transverse in orientation to both the longitudinal axis of modified tubular 39 and discrete communication regions 47 defined by the axial slots. As is shown in FIG. 4a, antenna pathways 91, 93, extend through each of the land portions which are disposed between the axial slots. Typically, modified tubular 39 is formed of steel, so the antenna windings disposed in the antenna pathways 91, 93 will communicate electromagnetic energy (either transmitting or receiving) through the portions of the antenna windings disposed within discrete communication regions 47, but will not perform any substantial communication with the wellbore and surrounding formation with antenna portions which are disposed in segments of antenna pathways 91, 93 which are enclosed by the material which forms modified tubular 39. In other words, the discrete communication regions 47 define portions of an antenna which are capable of sufficient communication of electromagnetic energy, while those portions of the antenna not located within discrete communication regions 47 are not very effective at communicating electromagnetic energy. In the preferred embodiment of the present invention, the axial grooves which define the discrete communication regions 47 comprise a groove which is three inches long, one-half inch deep, and one-eighth of an inch wide. The method of manufacturing a tubular with this particular geometric configuration will be discussed in detail in connection with a detailed description of the manufacturing method. Modified tubular 39 further includes junction box which is machined into modified tubular member 39, and which allows for the threading of the antennas through the antenna pathways 91, 93, and which also houses electronics associated with the antenna. In particular, junction box 49 houses one pick-up coil, preferably a toroid, which is utilized to detect current in a receiving antenna, and one or more capacitors or other electrical components which are utilized to tune the antenna windings to be responsive to particular frequencies or frequency ranges; although voltage across the coil could be monitored instead of current. A drilled or milled wireway is provided (but not depicted) to allow electrical signals to be passed via a wire to the signal conditioning and signal processing equipment.

FIG. 4b provides a view of modified tubular 41, which includes radially-reduced portion 95, and radially-enlarged portion 97, with a plurality of discrete communication regions 99 formed in radially-enlarged portion 97. Discrete communication regions 99 include axial slots 101, 103, 105, 107, 109, 111, and 113 which are separated by land portions 115, 117, 119, 121, 123, 125. Antenna pathway 127 is formed in radially-enlarged portion 97 and defines an antenna path which is substantially circular in configuration, and transverse to the longitudinal axis of modified tubular 41 as well as to discrete communication regions 99. Junction box 129 is formed in radially-enlarged portion 97, and allows antenna windings to be threaded through antenna pathway 127. As is shown, the antenna pathway 127 defines a series of alternating closed and open portions, with the open portions allowing the communication of electromagnetic energy between an antenna winding disposed within antenna pathway 127 and the wellbore and surrounding formation. The segments of the antennas which are disposed in discrete communication regions 99 will provide good communication of electromagnetic energy, while those portions of the antenna disposed within the land members will not provide good communication of electromagnetic energy.

Junction box 129 of FIG. 4b also holds any required signal pick-up electronics or tuning electronics. For both modified tubulars 39, 41, junction boxes 49, 129 will be enclosed and sealed to prevent wellbore fluids from entering and damaging the electronic components contained therein. Furthermore, all of the cavities, including discrete communication regions 47 in the embodiment of FIG. 4a, and discrete communication regions 99 of the embodiment of FIG. 4b, are filled with a non-conducting protective material, such as epoxy, which may be applied during a conventional vacuum-filling process. Additionally, magnetically permeable, and perhaps electrically-alterable, filler inserts are provided in particular ones of the discrete communication regions to boost the gain of the particular portion of the antenna winding which is also disposed within that particular discrete communication region. This feature will be discussed in greater detail below.

Figure 5:
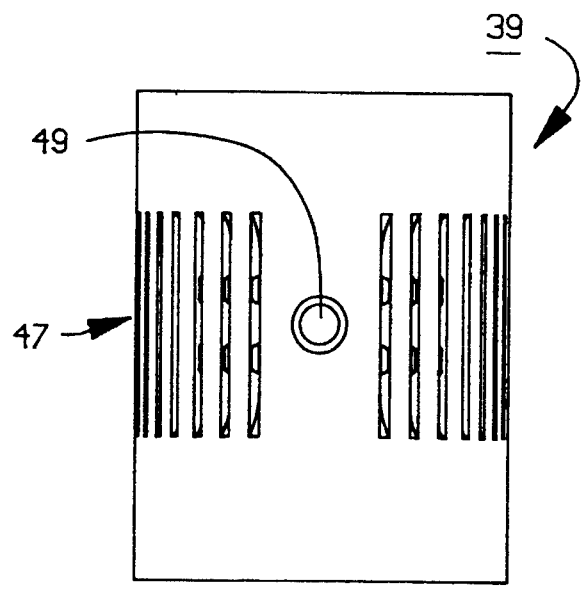
Figure 6:
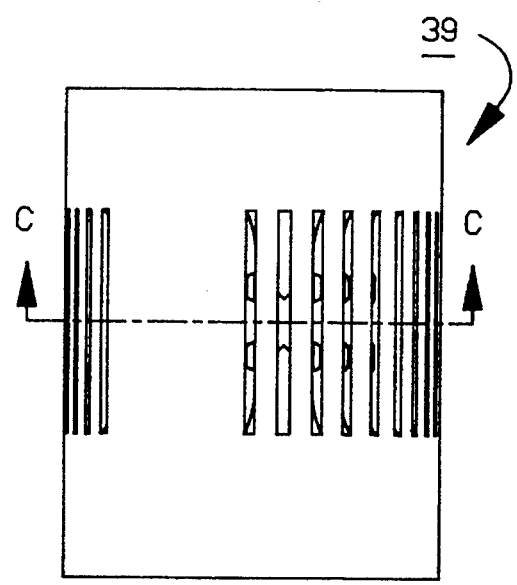
Figure 7:
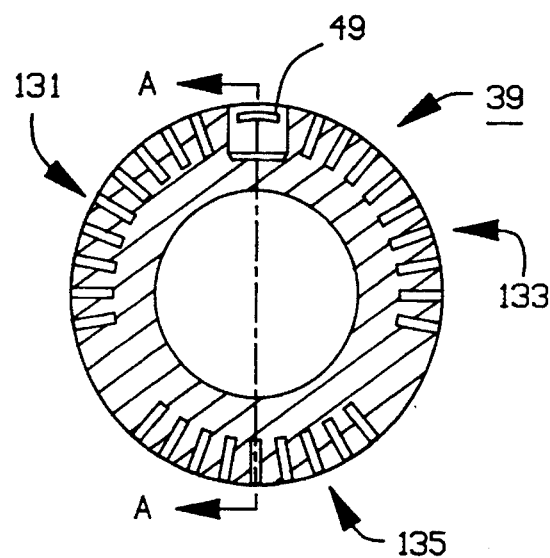

FIGS. 5, 6, 7, and 8 provide detail views of the modified tubular 39 which is depicted in FIG. 4a. In FIG. 5, junction box 49 is shown disposed with discrete communication regions 47 disposed on both sides. FIG. 6 provides a view of the side which is obscured in FIG. 5. Together, they display the configuration of all axial slots which make up discrete communication regions 47. FIG. 7 is a section view of modified tubular 39 as seen along section lines C—C of FIG. 6. As is shown in FIG. 7, discrete communication regions 47 are disposed in three groupings, including slot group 131, slot group 133, and slot group 135. Slot groups 131, 133 are disposed adjacent junction box 49. This particular geometric configuration is for the purpose of obtaining a particular antenna gain response. This is necessary because the portion of the tubular which includes the junction box 49 provides a region which is less able to accommodate magnetic flux. This is graphically depicted in FIG. 15, which provides a plot of azimuthal position, in degrees from 0° to 360° versus antenna gain. In this figure, the azimuthal location of the discrete communication region 47 is provided in schematic form, with dots 137, 139, 141, 143, 145, 147, 149, 151, 152, 153, 155, 157, 159, 161, 163, 165, and 167 being representative of discrete communication regions 47. Junction box 49 is located in the region of 0° to 10° and 350° to 360°. This provides an imbalance in the gain of the antenna member, which is graphically depicted in FIG. 15 by the asymmetrical shape of a plot of the antenna gain versus azimuthal position. In this particular configuration, the antenna member is more sensitive to electromagnetic energy in the range of 90° to 270° than it is in the regions between 0° and 90° and 270° and 360°. The antenna member would thus, when operated as a transmitter, more effectively and deeply interrogate the portion of the borehole disposed adjacent the portion of the tool between 90° and 270°. The antenna would less efficiently interrogate the formation which is aligned with the portion of the tool between 0° through 90° and 270° through 360°. The same is true for the antenna operating in a reception mode of operation. The antenna will be more receptive to electromagnetic energy emitting from the borehole and surrounding formation which is adjacent the tool between 90° and 270°, than it is for other portions of the antenna member.

Figure 8:
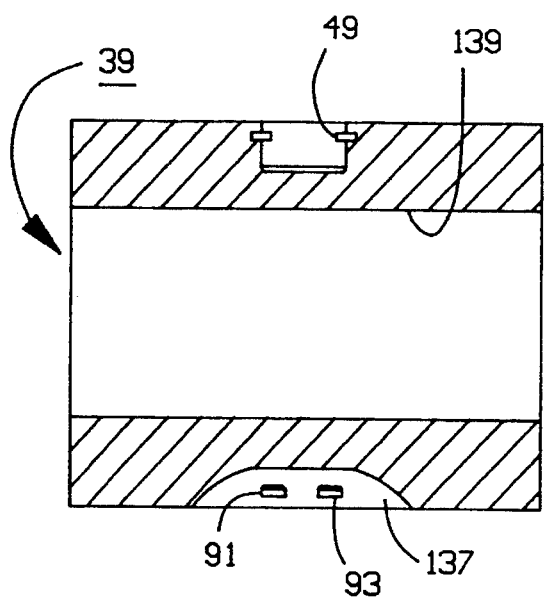

The geometric arrangement of the discrete communication regions 47 of FIG. 7 is one way of adjusting the imbalance in the antenna sensitivity due to the presence of junction box 49. In this particular configuration, a greater number of discrete communication regions 47 are provided adjacent junction box 49, than is found in other portions of the modified tubular 39, to balance the loss of sensitivity in the antenna due to the existence of the junction box 49. FIG. 8 provides a longitudinal section view taken along section line A—A of FIG. 7. One particular axial slot 137 is depicted in this view, with antenna pathways 91, 93 depicted communicating therewith. In this configuration the antennas disposed in antenna pathways 91, 93 are used as transmitters, preferably to transmit at two different frequencies, such as 2 MegaHertz and 400 KiloHertz. This view also depicts central bore 139 of modified tubular 39.

Figure 9:
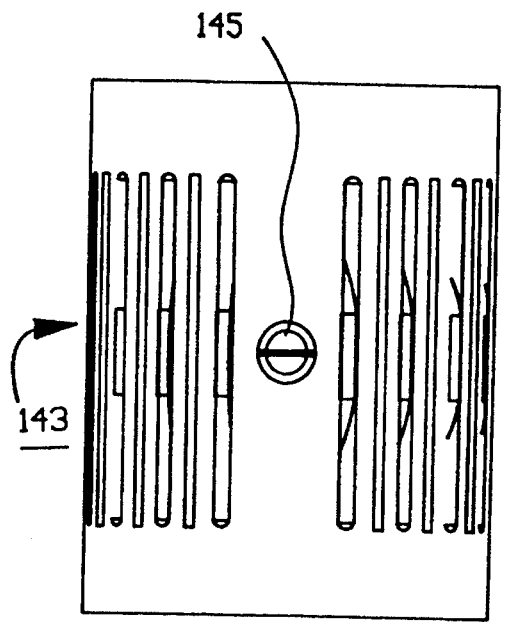
FIGS. 9, 10, and 11 provide detail views of an alternative construction to that of the views of FIGS. 4a, 5, 6, 7, and 8.
Figure 10:
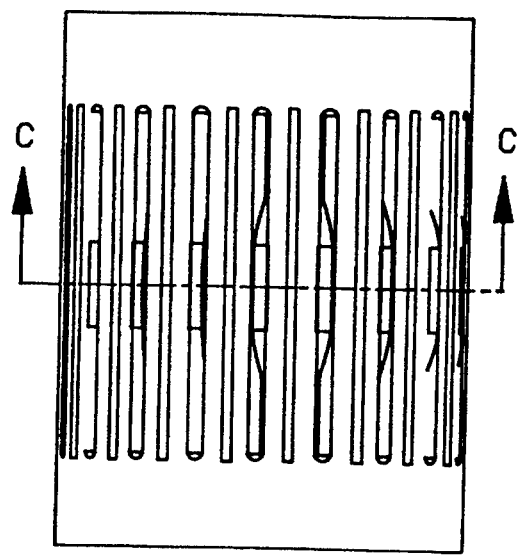
Figure 11:
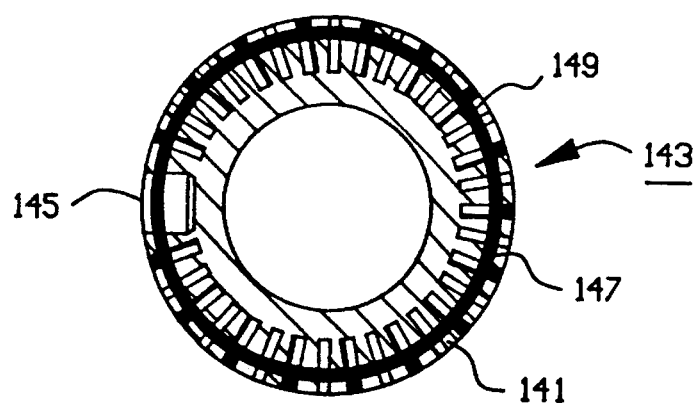

FIGS. 9, 10, and 11 depict an alternative modified tubular 141. As can be seen in FIG. 9, a plurality of discrete communication regions 143 are provided. FIG. 10 provides a view of the portion of modified tubular 141 which is obscured in FIG. 9. FIG. 11 provides a section view taken along section line C—C of FIG. 10. As is shown, the plurality of discrete communication regions 143 are substantially uniformly disposed about the circumference of modified tubular member 141, except for the region of junction box 145. Antenna member 147 is shown disposed within the single antenna pathway 149 which is provided in modified tubular 141.

Figure 12:
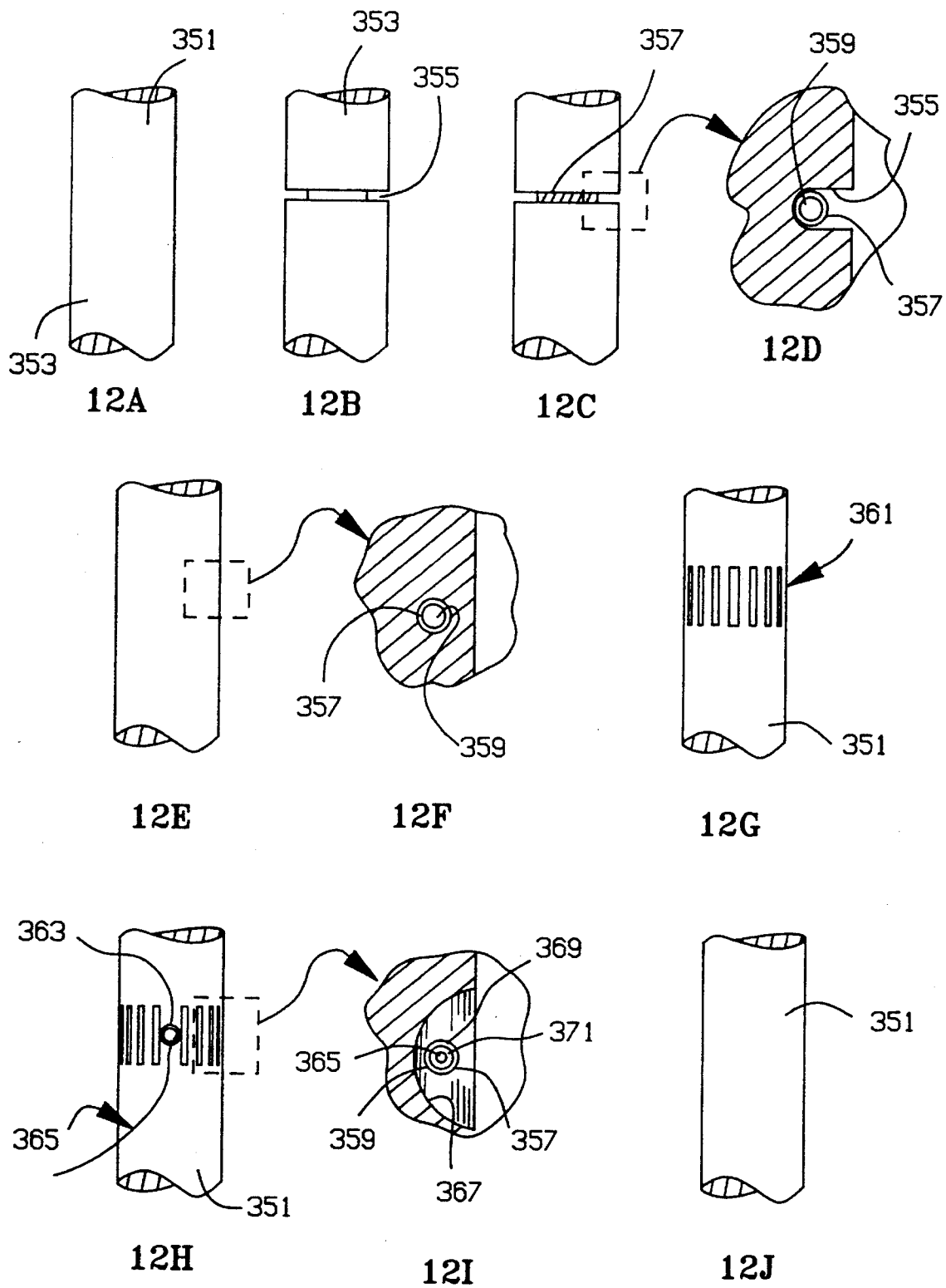
FIGS. 12a through 12j provide views of one technique for constructing an antenna assembly in accordance with the present invention.
Figure 13:
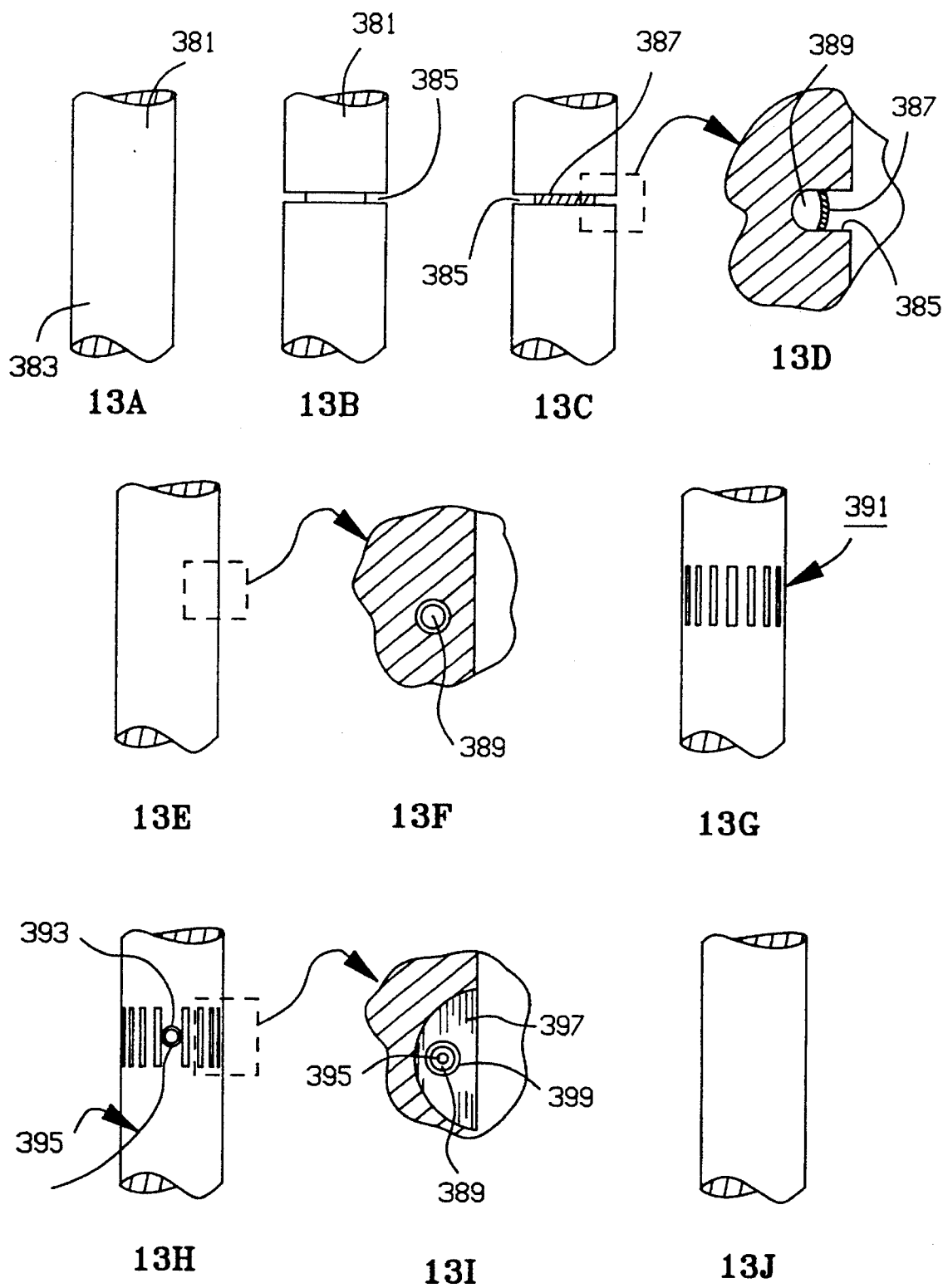
FIGS. 13a through 13j provide views of the preferred technique for constructing an antenna assembly in accordance with the present invention.

FIGS. 12 and 13 provide a detailed progression view of two methods of manufacturing antenna assemblies in accordance with the present invention. Turning first to FIG. 12, a cylindrical tubular member 351 is provided with a substantially cylindrical outer peripheral surface 353, as is depicted in FIG. 12a. Then, as is depicted in FIG. 12b, a circumferential groove 355 is cut into outer peripheral surface 353 of cylindrical tubular member 351. Then, as is shown in FIGS. 12c and 12d, a flexible metal tubular member 357 is disposed in the lowermost portion of circumferential groove 365. Preferably, the tube includes a central cavity 359, and is adapted in length and diameter to fit securely in the lowermost portion of circumferential grooves 55, and extend all the way around cylindrical tubular member 351. Next, as is shown in FIGS. 12e and 12f, circumferential groove 355 is filled with a binding material. Preferably, welding operations are used to close up circumferential groove 355. The welding operations complete fill circumferential groove 355 except for the central cavity 359 of metal tube 357. This welding process restores strength to the cylindrical tubular member 351. Then, as is shown in FIG. 12g, a plurality of axial semi-circular slots 361 are machined into the exterior surface of cylindrical tubular member 351. Preferably, they are evenly spaced apart about the outer peripheral surface 353 of cylindrical tubular member 351. The sole exception is the portion which receives junction box 363 which also machined into cylindrical tubular member 351. Then, as is shown in FIG. 12h, antenna member 365 is threaded through junction box 363 into the antenna pathway defined by metal tube 357. FIG. 12i provides a detail longitudinal section view of one of the axial slots formed in the body of cylindrical tubular member 351. Axial slot 367 is bound on each side (although only one side is shown) with a land region, such as land region 369, which has metal tube 357 extending therethrough with central cavity 359 including antenna 365 and an insulating material 371. Preferably, the insulating material is vacuum-filled epoxy which electrically isolates antenna 365 from metal tube 357. Finally, as is shown in FIG. 12j, all visible cavities on cylindrical tubular member 51 are filled with a protective material, such as epoxy or fiberglass, which allow the antenna portions which are disposed within the axial slots to communicate with regions exterior of the tubular member, but which prevent physical damage to the antenna portions. With these cavities filled, cylindrical tubular member 351 appears to be of uniform diameter with neither axial slots or junction box visible from the exterior. The filler material prevents the antenna member from becoming damaged by contact with corrosive fluids, high pressures and high temperatures, but principally protects the antenna member from physical damage through contact with the wellbore or wellbore cuttings.

FIGS. 13a through 13j provide a simplified progression view of a second, and preferred, method of manufacturing an antenna assembly in accordance with the present invention. A substantially cylindrical tubular member 381 is provided with cylindrical outer peripheral surface 383. A circumferential groove 385 is machined into cylindrical outer peripheral surface 383 about cylindrical tubular member 381. Then, as is shown in FIG. 13c, a flexible metal strip 387 is placed in circumferential groove 385. This flexible metal strip 387 is also depicted in the detail view of FIG. 13d. Antenna pathway cavity 389 is disposed radially inward of flexible metal strip 387. Then, in accordance with FIG. 13e, welding operations are performed to substantially fill all of circumferential groove 385, leaving only circular antenna pathway 389 unfilled. The weld returns the cylindrical tubular member to its original strength. Then, as is shown in FIG. 13g, a plurality of axial slots 391 are machined into the outer peripheral surface 383 of cylindrical tubular member 381, with the exception of the region which receives junction box 393, which is depicted in FIG. 13h. Antenna member 395 is threaded into antenna pathway cavity 389 through junction box 393. FIG. 13i provides a partial longitudinal section view of axial slot 397, depicting antenna pathway 389, with antenna member 395 disposed therein. Insulating material 399 is provided between antenna member 395 and flexible metal strip 387 to completely fill the cavity of antenna pathway 389. Preferably, the insulating material comprises a vacuum-filled epoxy which mechanically and electrically isolates antenna member 395. All cavities, including axial cavities 391, are also filled with a magnetic permeable, but nonconducting material, such as vacuum-filled epoxy or fiberglass, to provide a substantially cylindrical tubular member which is depicted in FIG. 13j.

FIGS. 14a, 14b, 14c, and 14d depict filler inserts which may be positioned within particular ones of the plurality of discrete communication regions. In FIG. 14a, filler insert 401 is depicted disposed within discrete communication region 403 (which is a semicircular axial slot), in a position intermediate tubular body 411 of tubular member and antenna pathway 405 which carries antenna 407 and a mechanically isolating and electrically insulating material 409. Current flows through antenna 407 (into or out of the page in FIG. 14a), generating an electromagnetic field 413 at communication region 403. In accordance with the preferred embodiment of the present invention, filler insert 401 is composed of a material which has a high electrical resistance and a low magnetic reluctance, wherein magnetic reluctance is defined as the ratio of magnetomotive force to total flux, and is represented by the formula $VM=P*R$, which is measured in terms of ampere-turns per weber (A-t/Wb). In other words, reluctance provides a measure of the flux carrying capacity of a material. The material is preferably of a high electrical resistance to prevent disruption of the antenna due to stray currents being carried in the tubular body 413, and also to minimize eddy current losses in the insert material. The low magnetic reluctance of the filler insert 401 allows for the magnetic flux lines of electromagnetic field 413 to flow through filler insert 401. Reluctance in the filler insert 401 is determined by (1) the magnetic permeability of the filler insert, (2) the geometry of the filler insert, (3) the frequency of the excitation current, and (4) the conductivity of the material of the filler insert. Owing to its conductivity, the steel of a tubular body is a very poor conductor of magnetic fields at high excitation frequencies. The ferrite or powdered iron used in forming the filler insert is at least ten times that as permeable as the permeability of air, so the filler insert conducts most of the magnetic fields past the steel of the tubular body and into the wellbore and surrounding formation, much better than if no filler insert were provided. The filler insert, in effect, provides a local boost of the communication of the magnetic field.

FIGS. 14b, 14c, and 14d show three different types of filler inserts. In FIG. 14b, filler 415 is formed of a ferrite or powdered iron which is positioned within discrete communication region 423, which is semicircular in longitudinal section, in a position intermediate tubular body 431 and antenna pathways 425, 427. In this particular configuration, filler insert 415 serves to boost the communication of electromagnetic energy for both the antenna disposed in antenna pathway 425 and the antenna disposed within antenna pathway 427. Of course, in accordance with the preferred embodiment of the present invention, the remaining space within discrete communication region 423 is filled with epoxy or fiberglass, to protect the antenna windings which extend across discrete communication region 423.

Figure 15:
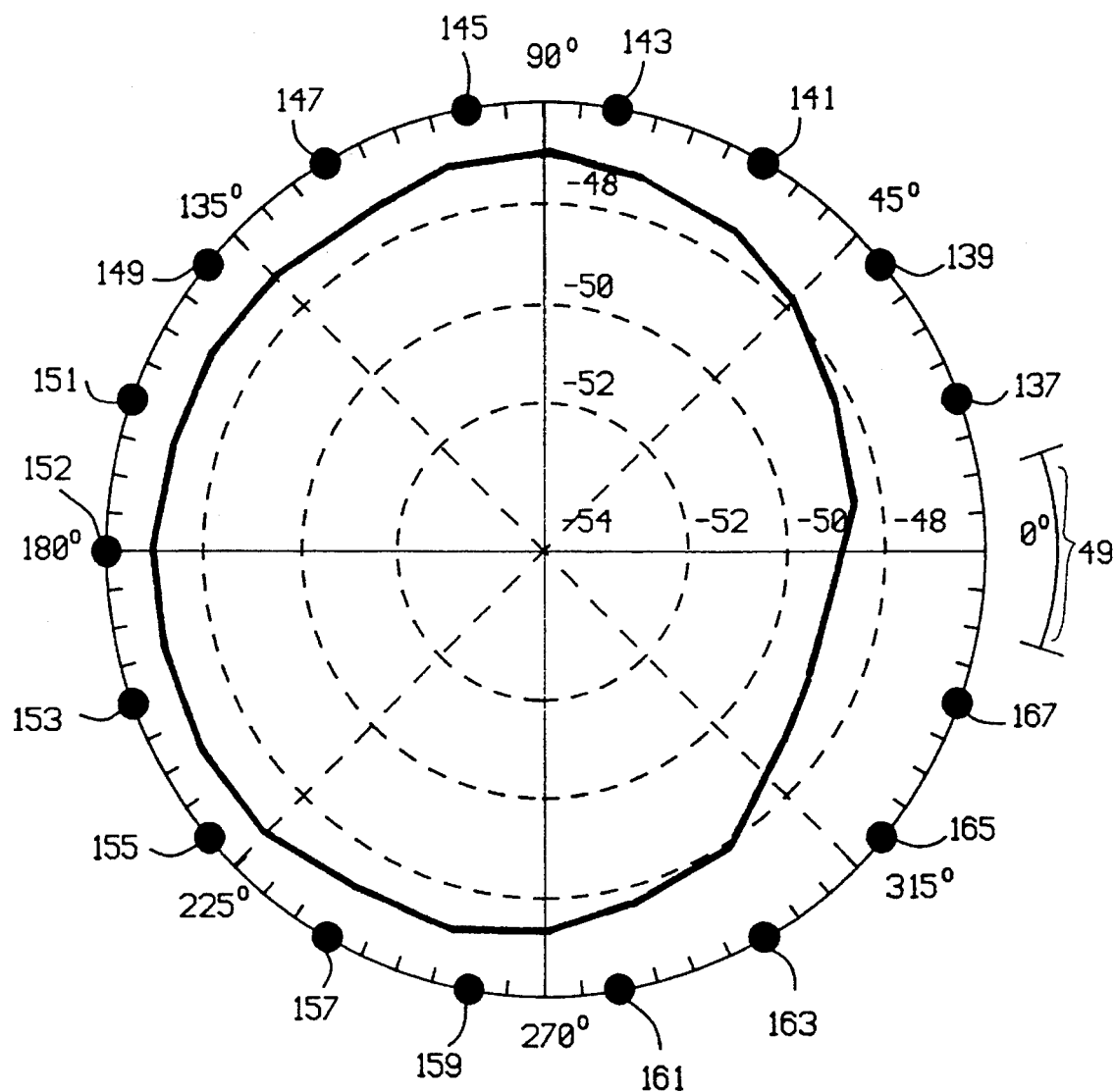
FIGS. 15, 16, and 17 provide views of antenna gain versus azimuthal position for three different operating conditions.

FIG. 14c depicts an alternative embodiment for the filler insert. As is shown, filler insert 417 is preformed and includes inner arcuate surface 419 and outer arcuate surface 421. The insert may be positioned within a semicircular-shaped discrete communication region in a position intermediate the tubular body and the one or more antennas which extend across the discrete communication region. Preferably, filler insert 417 is formed of a magnetically permeable material, such as ferrite, which has a relatively high electrical resistance and a relatively low magnetic reluctance. In accordance with the present invention, a plurality of pre-formed filler inserts may be provided, and positioned about the antenna assembly in a particular predetermined configuration, to boost the communication of electromagnetic energy between particular segments of the antenna as compared to other particular segments of the antenna. For example, pre-formed filler inserts may be disposed at particular locations about the antenna assembly to compensate for the detrimental impact the junction box has upon the antenna's response. FIG. 15 depicts an azimuthally asymmetrical response, due to the position of the junction box. One way to compensate for this azimuthal asymmetrical response is to form the plurality of discrete communication regions in a particular pattern which then provides for a more azimuthally symmetrical response. The utilization of filler inserts is another means for compensating for the asymmetrical responsiveness of the antenna member. The filler insert of FIG. 14c may be positioned in particular ones of a plurality of discrete communication regions to boost the antenna gain in regions adjacent the junction box (or other mechanical obstruction which interferes with symmetrical communication of electromagnetic energy) to provide a more balanced response. The response which is depicted in FIG. 15 effects the antenna in either a transmission mode of operation, wherein an energizing current is received by the antenna winding which then produces an electromagnetic field, or a reception mode of operation, wherein an electromagnetic field passing around the antenna winding generates a current within the winding.

Figure 16:
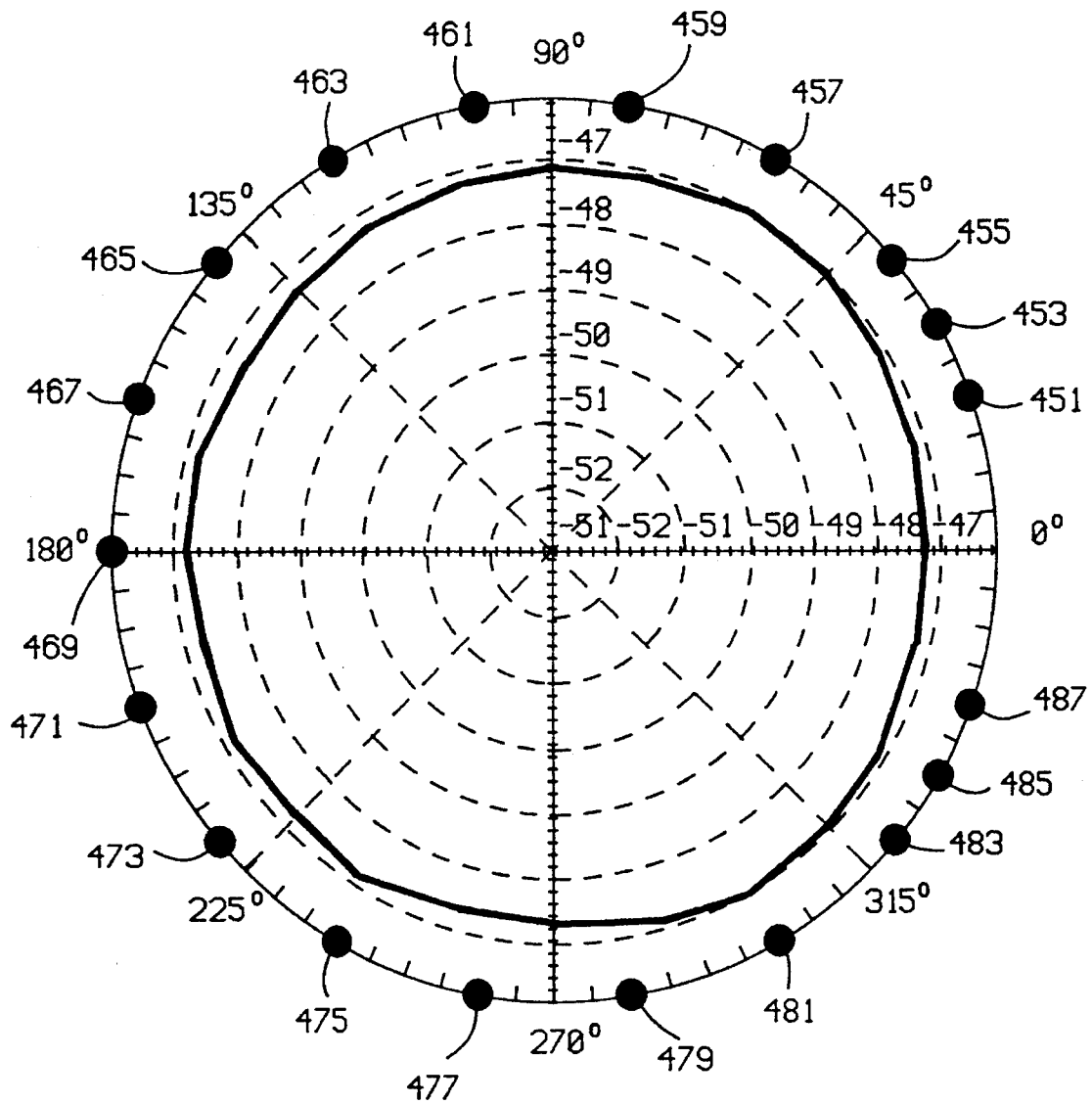

FIG. 16 is a plot of antenna gain versus azimuthal position. The position of the antenna winding with respect to the tubular is defined in degrees between 0° and 360°. Antenna gain at the particular azimuthal positions is determined with respect to a plurality of concentric gain contour lines which correspond to gain values established by the X-axis and Y-axis. In this figure, the position of magnetically permeable filler inserts (preferably formed of ferrite) is depicted by dots 451, 453, 455, 457, 459, 461, 463, 465, 467, 469, 471, 473, 475, 477, 479, 481, 483, 485, and 487. A junction box is disposed in the region approximately 10° above and 10° below the 0° azimuthal position. Note, however, that a greater number of magnetically permeable filler inserts are provided in regions adjacent the junction box, to boost the gain at those segments of the antenna to enhance the communication of electromagnetic energy between the antenna and the borehole and surrounding formation. This higher density of magnetically permeable filler inserts compensates for the asymmetrical antenna gain which is expected due to the presence of the junction box (which is depicted in FIG. 15). The antenna gain profile of FIG. 16 is that of a substantially azimuthally symmetrical gain, with no directionally preferential communication of electromagnetic energy.

The present invention also contemplates the intentional focusing of the communication of electromagnetic energy in a particular azimuthal orientation. The present invention also contemplates the automated alteration of antenna gain during drilling operations. These objectives are achieved utilizing a filler insert which is depicted in simplified form in FIG. 14d. As is shown, filler insert 489 is semicircular in shape, and adapted in size and configuration to be inserted within a particular discrete communication region, which is preferably a semicircular axial groove. Preferably, filler insert 489 is formed of a magnetically permeable material, such as ferrite, which presents a high resistance to the flow of electrical current, but which provides a low reluctance to the flow of magnetic flux. Windings 491 are provided about at least a portion of filler insert 489. The windings include terminals 493, 495, which allow for the passage of electrical current through windings 491 to magnetically saturate the material which comprises filler insert 489. Once filler insert 489 is completely magnetically saturated, it is unable to carry any additional magnetic flux, and thus cannot serve to boost the gain of the segment of the antenna which runs above filler inset 489. If the filler insert 489 is only partially magnetically saturated, the flux-carrying capacity of filler insert 489 is reduced in a proportionate amount, and will be available to boost the communication of electromagnetic energy between the adjoining antenna segment and the wellbore and surrounding formation in a selected amount, less than the maximum amount. By providing these electrically-alterable magnetically permeable filler inserts in every one of the plurality of the discrete communication regions provided in an antenna assembly in accordance with the present invention, current may be supplied to particular ones of the plurality of electrically-alterable magnetically permeable inserts in a manner which preferentially directs (or focuses) the communication of electromagnetic energy between the antenna and the wellbore and surrounding formation.

Figure 17:
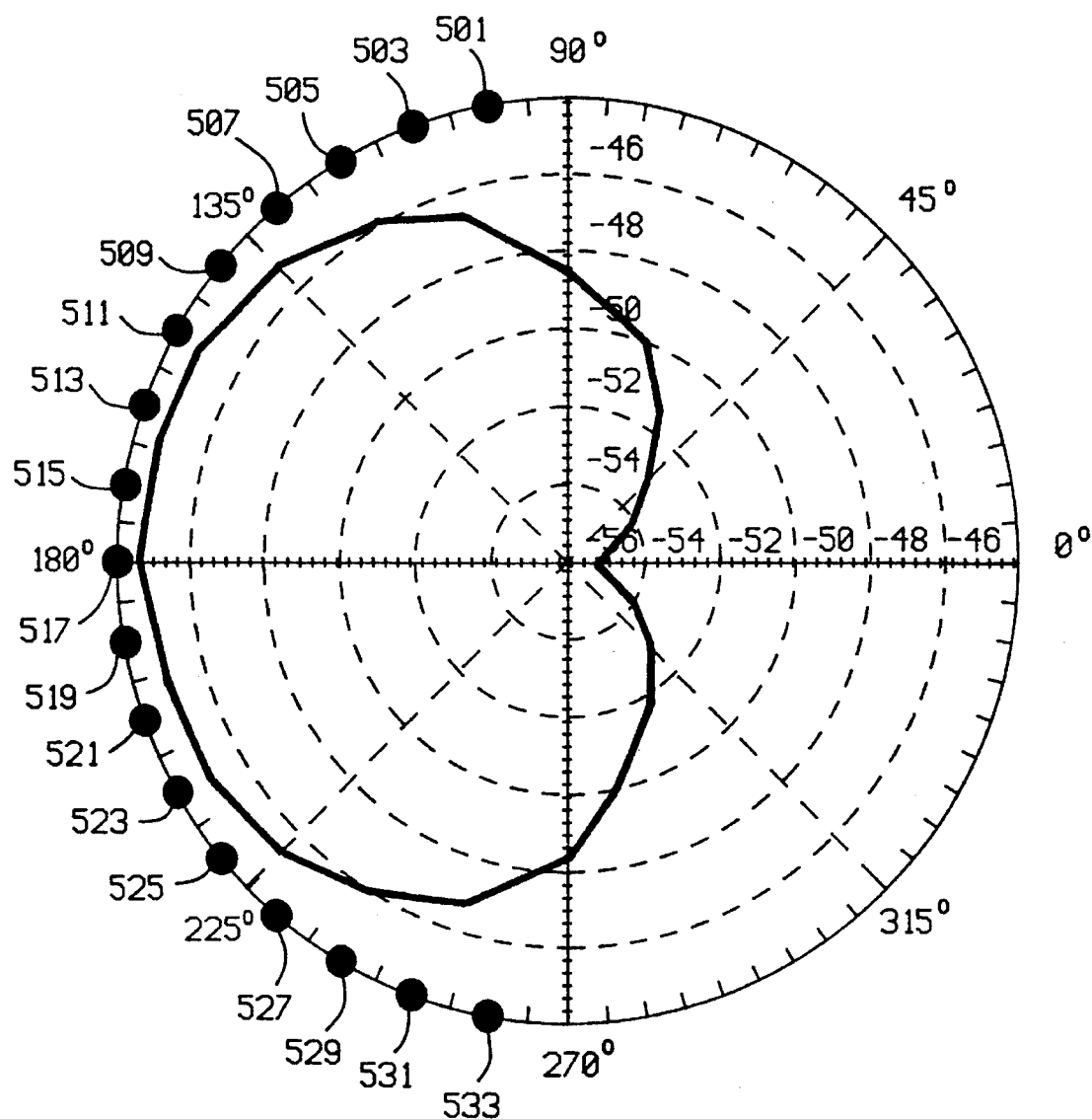

FIG. 17 is a plot of azimuthal position and antenna gain, which graphically depicts the gain of the antenna when magnetically permeable filler inserts 501, 503, 505, 507, 509, 511, 513, 515, 517, 519, 521, 523, 525, 527, 529, 531, and 533 are provided in a plurality of discrete communication regions (axial slots) in the range of 90° and 270°. Note that the communication of electromagnetic energy is boosted greatly in the region between a 135° azimuthal position and a 225° azimuthal position. In accordance with the present invention, electrically-alterable magnetically permeable filler inserts may be provided in discrete communication regions which are substantially evenly distributed azimuthally about the wellbore tubular. Then, control current is utilized to selectively reduce the flux-carrying capacity of particular ones of the electrically-alterable magnetically permeable inserts in order to obtain a azimuthally preferential communication of electromagnetic energy between the antenna windings and the wellbore and surrounding formation. This feature is useful for either a receiving mode of operation or a transmitting mode of operation. In a receiving mode of operation, the antenna is much more sensitive to electromagnetic fields which are in the wellbore and surrounding formation in a region adjacent the portion of the tool which is receiving the benefit of the maximum flux-carrying capacity of the electrically-alterable magnetically permeable filler inserts, while it is less sensitive to electromagnetic energy in the borehole and surrounding formation which is adjacent portions of the wellbore tool which include antenna segments which are not receiving the benefit of the flux carrying capacity of the electrically-alterable magnetically permeable filler inserts. In a transmission mode of operation, a greater amount of electromagnetic energy is transmitted into the borehole and surrounding formation from segments of the antenna which are receiving the maximum benefit of the electrically-alterable magnetically permeable filler inserts, while portions of the antenna which are not receiving the assistance of the electrically-alterable magnetically permeable filler inserts in carrying magnetic flux are emitting far less electromagnetic energy into borehole and surrounding formation.

The present invention can be characterized as a measurement-while-drilling system which includes two transmitting antennas and two receiving antennas, which are under the control of a data processor, such as a microprocessor, and which can be utilized to derive a measure of the amplitude attenuation and phase shift of an electromagnetic signal propagated through the borehole and surrounding formation. Such a measurement-while-drilling apparatus is depicted in block diagram and schematic form in FIGS. 18, 19, 20, 21, 22, 23, and 24. The measurement-while-drilling apparatus depicted in these figures corresponds to that of U.S. Pat. No. 4,081,419, which issued on Jan. 14, 1992 to Meador et al., and which is entitled "High Sensitivity Well Logging System Having Dual Transmitter Antennas and Intermediate Series Resonant Antennas", which is incorporated herein as if fully set forth. This is merely one type of measurement-while-drilling apparatus which can be utilized in combination with the improved antenna assembly of the present invention; the present invention may find equal or greater utility when utilized with other types of measurement-while-drilling tools.

With reference to the simplified functional block diagram of FIG. 18, there will now be described general features of the overall organization of signal transmitting, signal receiving, and signal processing circuitry incorporated in the preferred embodiment.

A measurement-while-drilling system embodying this invention preferably includes a turbine-driven generator that converts mechanical power supplied by downflowing drilling mud to electrical power. In a conventional and well known manner, a DC regulator responds to the generator and supplies DC power which, although regulated to some extent, is subject to a fairly substantial variation in voltage. This DC power is applied to a DC-to-AC converter 161. A quartz crystal 163 that resonates 20 Khz is coupled to circuitry 161 so that the AC power-supply voltage it supplies is at or very close to 20 Khz, and is in the form of a square wave. As explained further below, this AC power-supply voltage defines a frequency reference, and is accordingly sometimes referred to as a frequency reference (FR) signal.

In a conventional and well known manner, the FR signal is coupled via transformers and connectors so that 20 Khz AC power-supply voltage is available to provide power to circuitry located in each electronics housing.

The circuitry includes drive circuitry 165 that is coupled to supply an oscillating drive signal to the first transmitting antenna means 167. The circuitry includes receiving circuitry 169, power supply circuitry 171, and data processing and timing and control circuitry 173. Receiving circuitry 169 is coupled to the first and second receiving antenna means 175 and 177. The circuitry includes drive circuitry 179 that is coupled to supply an oscillating drive signal to the second transmitting antenna means 181.

Circuitry 173 includes a microprocessor and associated circuitry, which together perform numerous functions, including a basic timing function for sequencing the alternating operation of the first and second transmitting antenna means.

The microprocessor provides a two-bit wide transmitter-select signal comprising an A bit and a B bit that are coded as follows: if the A bit and the B bit have same binary value (whether both "1" of both "0") then this represents a command to turn both transmitters off; if the A bit is "1" and the B bit is "0", then this represents a command to turn transmitter 1 on and turn transmitter 2 off; and, if the A bit is "0" and the B bit is "1", then this represents a command to turn transmitter 1 off and turn transmitter 2 on. In the preferred embodiment, a "1" binary value is represented by +5 volts, whereas a "0" binary value is represented by 0 volts (ground).

Figure 18A:
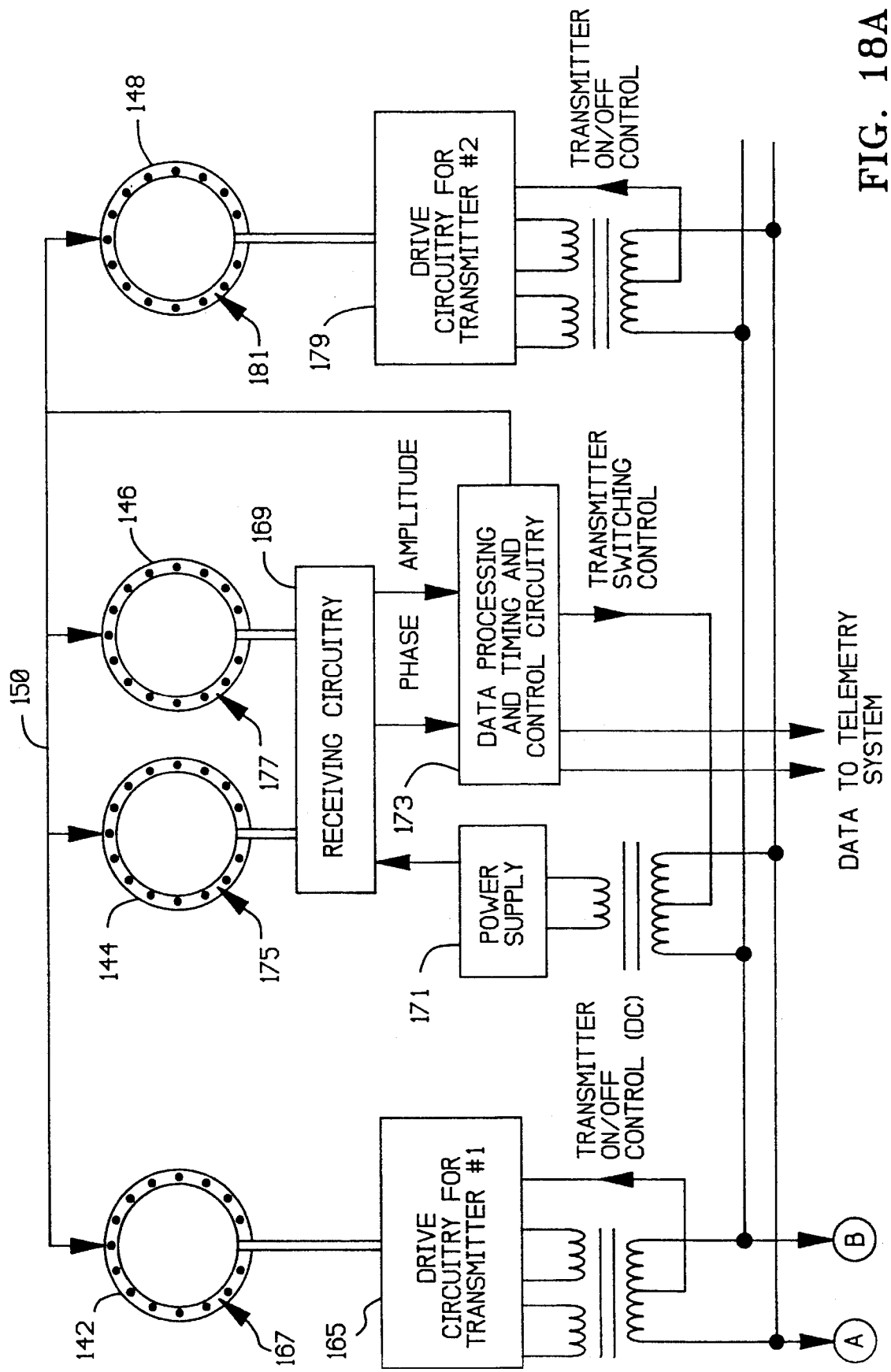
FIG. 18 is a simplified functional block diagram illustration of the overall organization of signal transmitting, signal receiving, and processing circuitry of a dual transmitter, dual receiver measurement-while-drilling tool in accordance with the present invention.
Figure 18B:
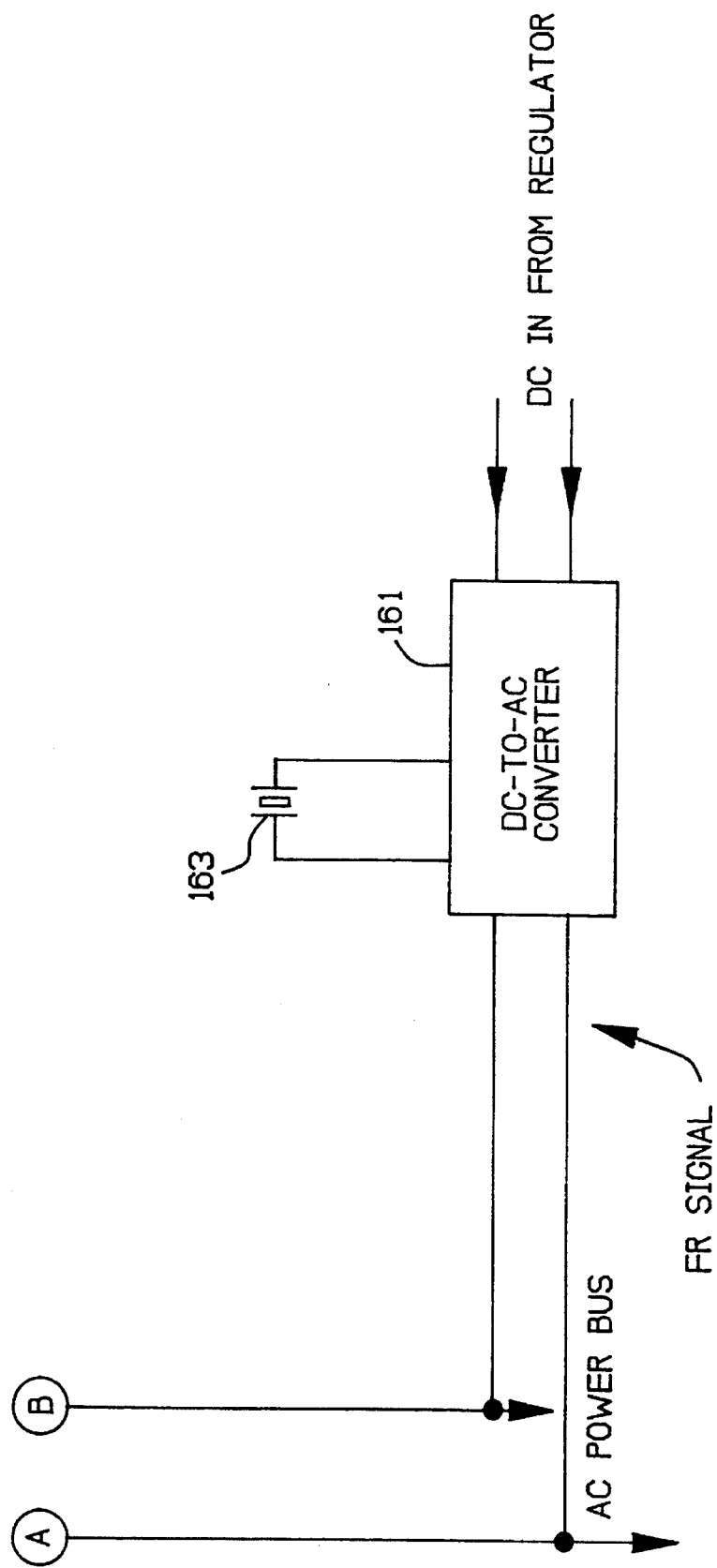
Figure 19A:
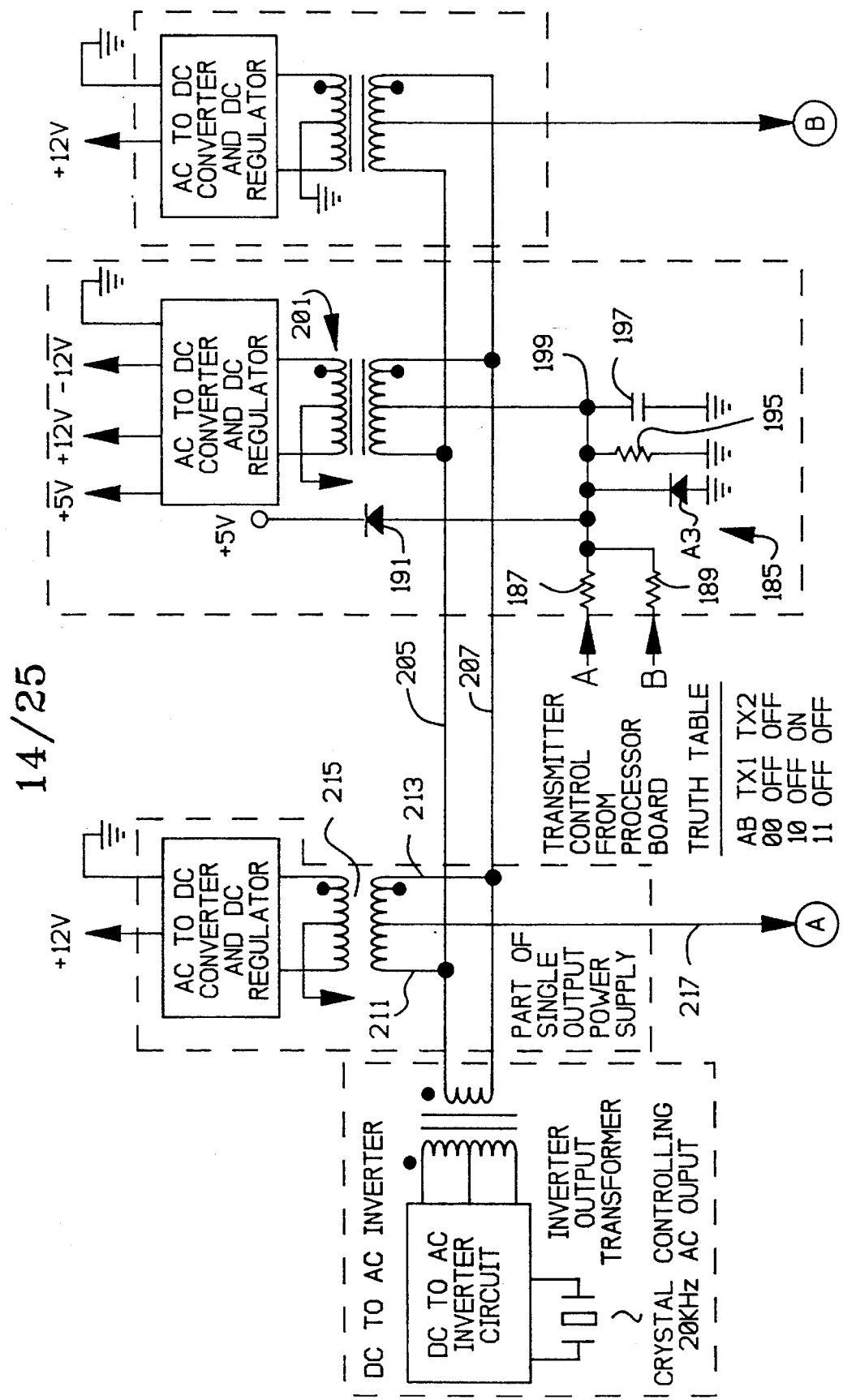
FIG. 19 is a schematic and block diagram view of a portion of the control circuitry incorporated in the preferred embodiment to provide switching control.
Figure 19B:
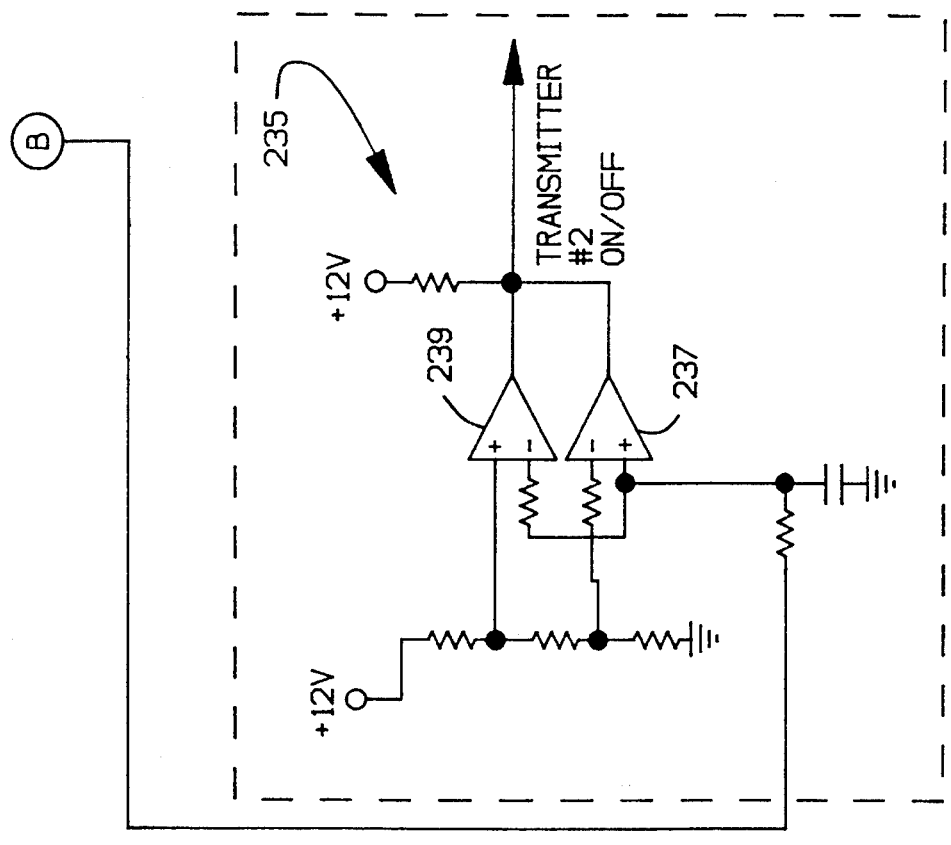
Figure 19B:
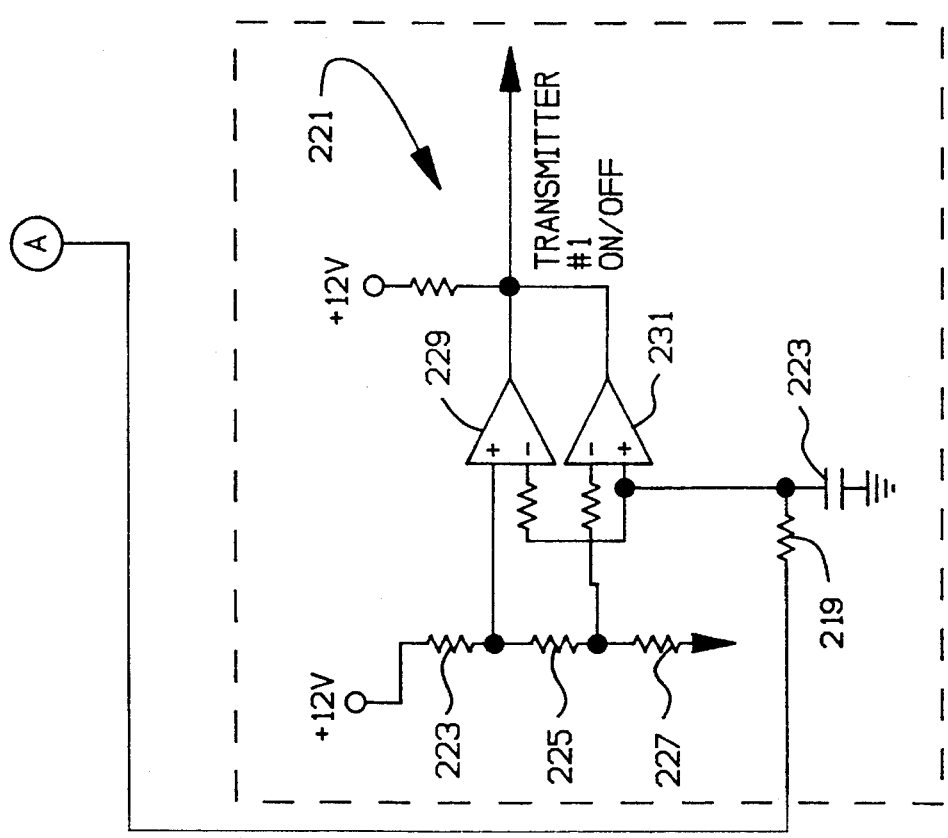

Also, as is shown in FIG. 18, transmitting antennas 167, 181 and receiving antennas 175, 177 may be provided with an array of electrically-alterable magnetically permeable filler inserts, including transmitter array 142, which is disposed about transmitting antenna 167, transmitter array 148, which is disposed about transmitting antenna 181, receiver array 144, which is disposed about receiving antenna 175, and receiver array, which is disposed about receiving antenna 177.

Figure 24:
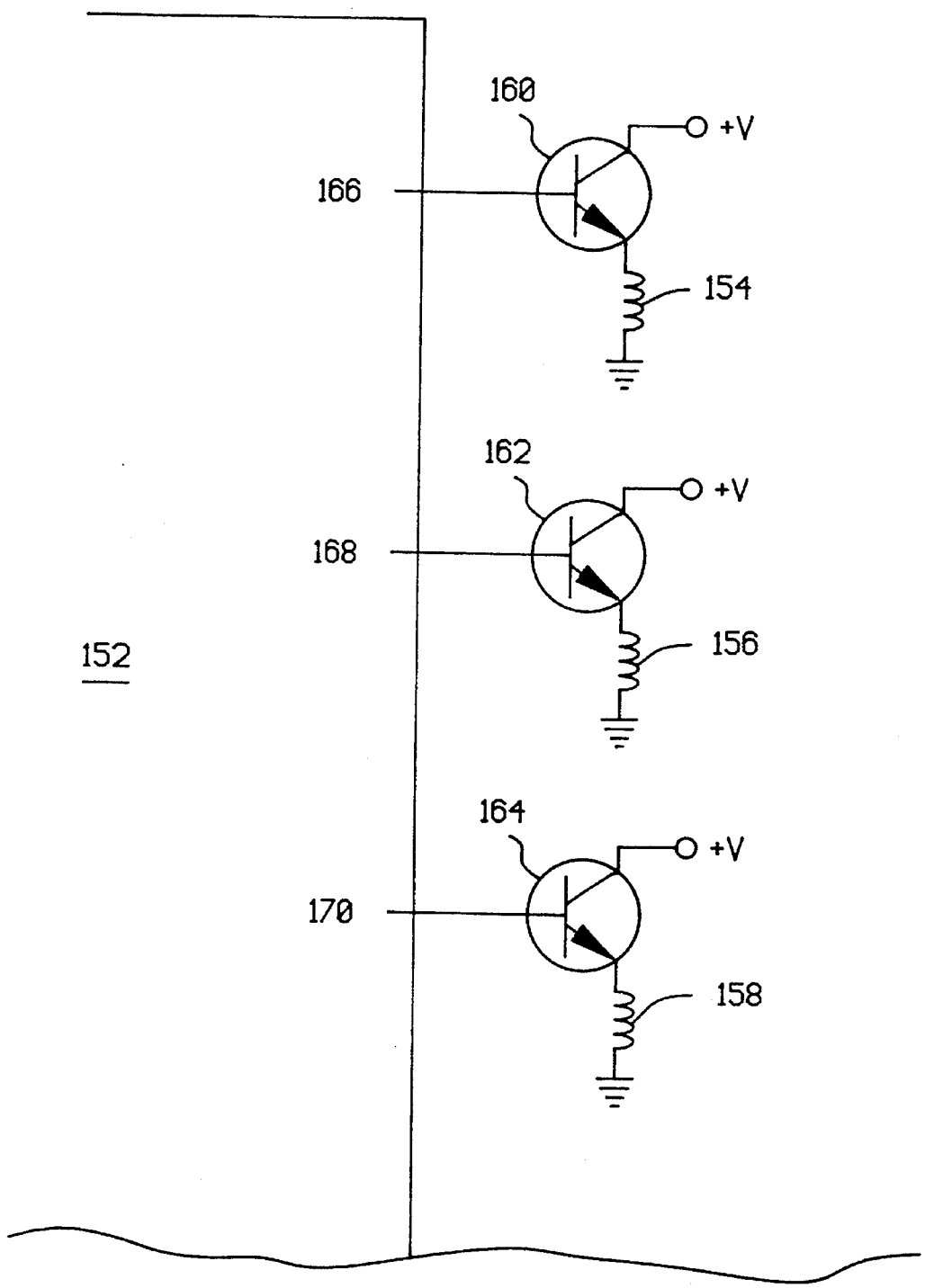
FIG. 24 is a simplified electrical schematic view of the arrangement utilized to implement processor control of the response of an antenna constructed in accordance with the present invention.

FIG. 24 provides a simplified electrical schematic view of how microprocessor 152 may be utilized to control the particular electrically-alterable magnetically permeable filler inserts. As is shown in simplified form in FIG. 24, microprocessor 152 includes output pins 166, 168, and 170. Output pins 166, 168, and 170 are coupled to the base of switching transistors 160, 162 and 164, respectively. The collector of switching transistor 160 is at +V volts; the collector of switching transistor 162 is at +V volts; the collector of switching transistor 164 is at +V volts. The windings 154 of one particular electrically-alterable magnetically permeable filler insert is coupled between the emitter of switching transistor 160 and ground. The windings 156 of another particular electrically-alterable magnetically permeable filler insert is coupled between the emitter of switching transistor 162 and ground. The windings 158 of still another particular electrically-alterable magnetically permeable filler insert is coupled between the emitter of switching transistor 164 and ground. The magnetically permeable, but saturable, material of the cores about which windings 154, 156, 158 are disposed may be saturated by application of electrical current to windings 154, 156, 158. If the program instructions in microprocessor 152 require that the beneficial effect of the electrically-alterable magnetically permeable filler insert associated winding 154 be withheld, output pin 166 provides a voltage to the base of switching transistor 160, causing current to flow through windings 154. When current flows through windings 154, the magnetically permeable core becomes saturated, and no longer able to boost the gain of the particular segment of the antenna which overlies the filler insert. The same is true for the filler inserts associated windings 156, 158. Should the program instructions of microprocessor 152 require that the filler insert associated winding 155 be neutralized, voltage is applied to the base of switching transistor 162 and current flows through windings 156 to saturate the magnetically permeable material of the filler insert, and withhold the "boost" normally provided by the insert. The windings may be "ganged" together to allow a single output pin of microprocessor 152 to control two or more windings. This would reduce the number of output pins required in order to obtain control over the electrically-alterable magnetically permeable filler inserts. A still greater economy may be obtained by utilizing a single output pin to provide a serial binary data stream, which is supplied to a converter which receives the serial input and provides a parallel output, to selectively remove the beneficial boosting impact of one or more of the electrically-alterable magnetically permeable filler inserts.

Figures 25, 26:
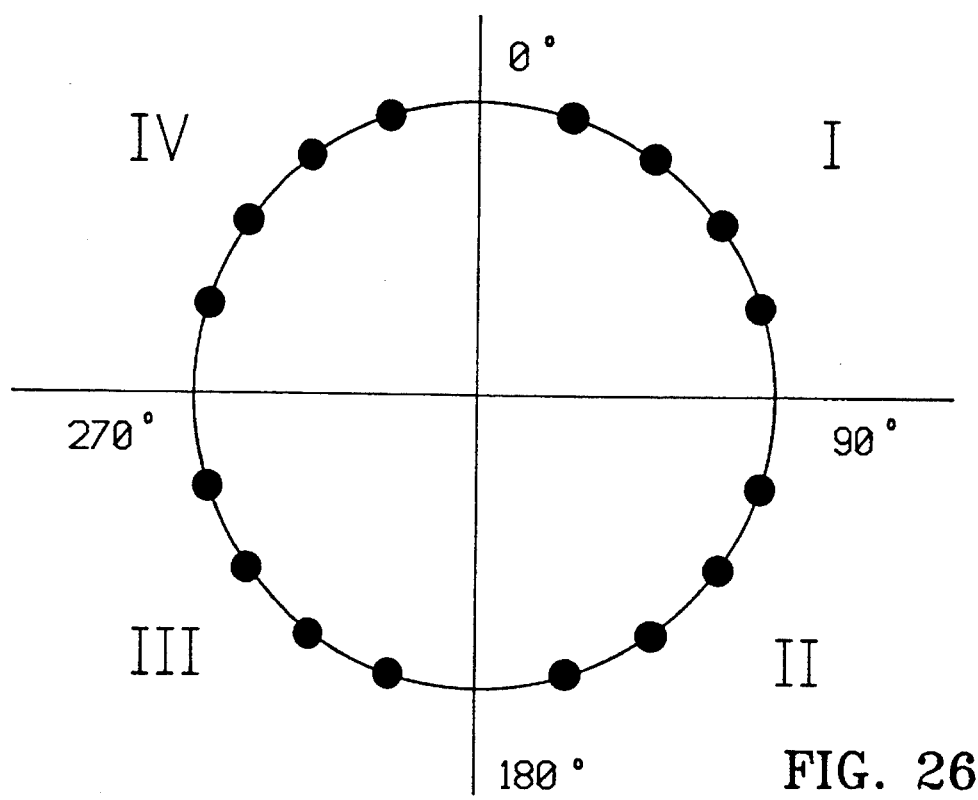
FIG. 25 provides in table format an overview of possible modes of operation for an antenna constructed in accordance with the present invention.
FIG. 26 is a schematic view of an antenna constructed in accordance with the present invention.

In accordance with the present invention, microprocessor 152 may be programmed to provide one of a selected number of predefined azimuthal preferences for the communication of electromagnetic energy. FIG. 25 provides a table with six different modes of operation which can be made available for selection by microprocessor 152. This table can be read in combination with FIG. 26, which provides a plot of azimuthal position and placement of electrically-alterable magnetically permeable filler inserts in particular discrete communication regions. In mode of operation number 1, the antenna assembly preferentially communicates electromagnetic energy in the region defined between 0° and 90° (quadrant I), by supplying an electric current to the control windings of the electrically-alterable magnetically permeable filler inserts which are located in the azimuthal positions between 130° and 315°. Mode of operation number 2 provides for preferential azimuthal communication in the region of 90° through 180° (quadrant II), which is accomplished by applying current to the control windings of the electrically-actuable magnetically permeable filler inserts in the azimuthal positions of 225° through 45°. In mode of operation number 3, electromagnetic energy is preferentially communicated in the region of 180° through 270° (quadrant III) by supplying current to the control windings of the electrically-alterable magnetically permeable filler inserts in the region of 315° through 135°. In the mode of operation number 4, electromagnetic energy is preferentially communicated in the azimuthal direction of 270° through 360° (quadrant IV) by supplying current to the control windings of the electrically-alterable magnetically permeable filler inserts in the azimuthal range of 45° through 220°.

In accordance with the present invention, control over the electrically-actuable magnetically permeable filler inserts may provide for a dynamic (that is, changing with respect to time) preferential communication of electromagnetic energy. In mode of operation number 5, electromagnetic communication is focused for even time intervals first in quadrant I, then in quadrant II, followed by quadrant III, and terminating at quadrant IV. Thus, the preferential communication of electromagnetic energy may rotate about the tool for approximately equal and fixed time intervals. In mode of operation number 6, the preferential communication of electromagnetic energy may rotate about the tool from 0° to 360°, with a difference in time intervals about the tool from 0° from 360°, for one or more of the quadrants. For example, electromagnetic energy may be communicated preferentially in quadrants I, II, and IV for the same, fixed time interval, but with a longer preferential communication of electromagnetic energy for quadrant III. In this event, preferential azimuthal communication occurs for quadrant I, for the time interval $X_1$, followed by preferential azimuthal communication for the region of quadrant IV for time interval $X_2$. Then, for quadrant III, azimuthal preferential communication of electromagnetic energy occurs for a longer time interval $Y_3$. Finally, azimuthally preferential communication occurs for quadrant IV for time interval $X_4$.

Figure 27:
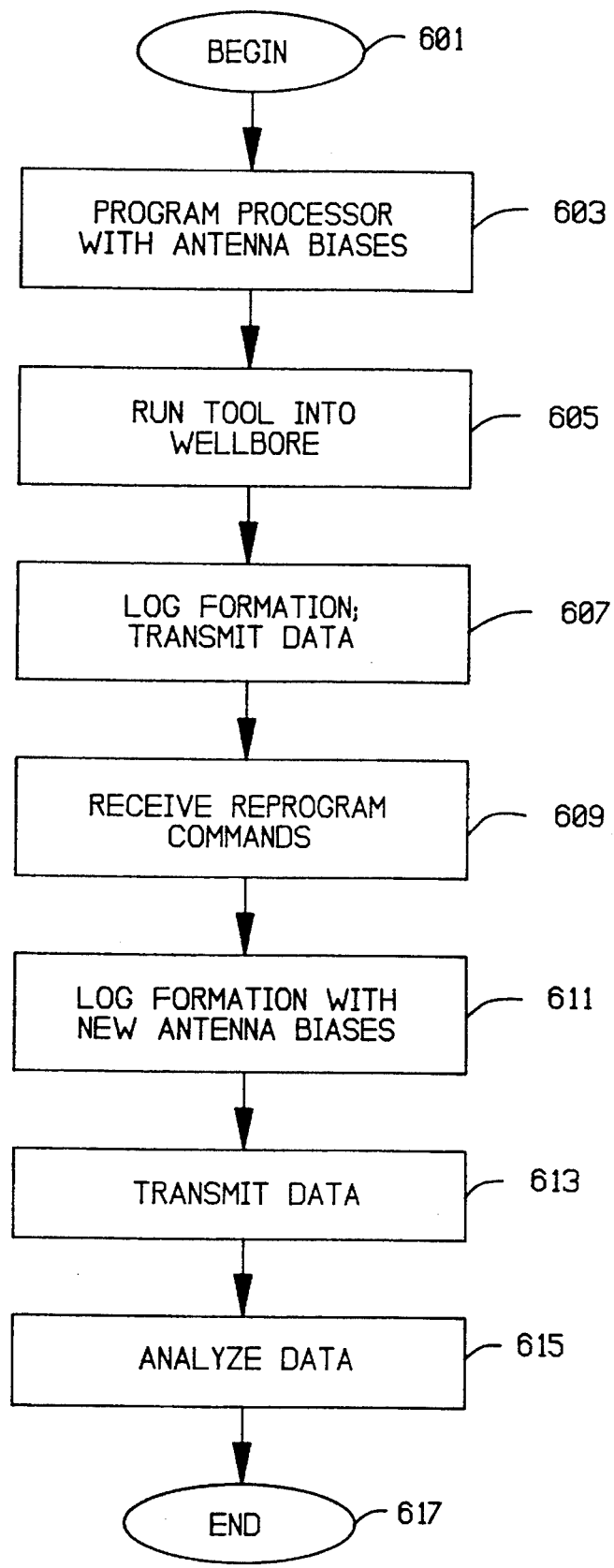
FIG. 27 is a high-level flowchart representation of the technique of utilizing processor control to configure antenna response.

In accordance with the present invention, the time durations for the intervals of preferential azimuthal communication may be determined during programming. In accordance with the present invention, the antenna assembly controller can be programmed with particular antenna communication biases either (1) before the antenna assembly is run into the hole, or (2) while drilling and logging operations occur with the antenna assembly remotely located from the surface. FIG. 27 provides in broad overview, the method steps of utilizing a programmable antenna bias, in accordance with the present invention. The process begins at software block 601, and continues at software block 603, wherein the processor is programmed with particular antenna biases. The plurality of operating modes may be defined in tabular form, such as set forth in FIG. 25, with a particular operating mode identified with a particular azimuthal preference and a particular duration. The wellbore tool may be programmed to provide particular azimuthal preferential communication in response to either (1), commands supplied from the surface, or (2) operating conditions encountered during drilling operations, or (3) in response to information derived from logging operations. In accordance with software block 605, the wellbore tool is run into the wellbore. Then, in accordance with software block 607, the formation is logged and data is transmitted to the surface utilizing a conventional mud pulse telemetry system. In accordance with software block 609, the wellbore tool receives reprogram commands from the surface. These commands may be transmitted utilizing radio frequency communication techniques, reverse mud pulse telemetry techniques, acoustic data communication techniques, or in any other conventional data transmission manner. Then, in accordance with software block 611, the wellbore tool of the present invention is utilized to log the formation with the new antenna biases. For example, the duration of a particular azimuthal preferential bias may be altered during reprogramming operations, to provide for longer or shorter intervals of preferential communication of electromagnetic energy. Next, in accordance with software block 613, the formation data obtained during the logging operations is transmitted to the surface utilizing the conventional mud pulse telemetry techniques. At the surface, the data is analyzed, in accordance with software block 615, and the process ends at software block 617.

In the preferred embodiment, the digitally coded transmitter select signal is converted to an analog signal by circuitry within electronics housing 73 and coupled to circuitry and electronics housings 71 and 75 in a highly advantageous way. In this regard, reference is made to FIG. 19. A weighting circuit generally indicated at 185 in FIG. 19 comprises a resistor 187, a resistor 189, a pair of protection diodes 191 and 193, a resistor 195, and a capacitor 197, all of which are connected to a common node point 199 that is connected to the center tap of a primary winding of a transformer 201. The resistance values of resistors 185, 187, and 195 are selected such that the potential at node point 199 constitutes an analog control signal.

Suitable resistance values are 1K ohm for resistor 187, 2K ohm for resistor 189, and 10K ohm for resistor 195. If each of the A bit and the B bit signals is +5 volts, then the potential at node point 199 is +4.69 volts. If each of the A bit and the B bit signals is 0 volts, then the potential at node point 199 is 0 volts. If the A bit signal is +5 volts and the B bit signal is 0 volts, then the potential at node point 199 is at or approximately +3.13 volts. If the A bit signal is 0 volts and the B bit signal is +5 volts, then the potential at node point 199 is at or approximately +1.56 volts. The opposite ends of the primary winding of transformer 201 are connected to conductors 205 and 207 that define an AC power bus within electronics housing 73 are connected to opposite ends of a center tapped primary winding of a transformer 215 within electronics housing 71. The center tap of this primary winding within electronics housing 71 operates at the same DC potential impressed on the center tap of the primary winding of transformer 201 within electronics housing 73.

A conductor 217 is connected between the center tap of the primary winding of transformer 215 to one end of a resistor 219 that forms part of an on/off control circuit arrangement generally indicated at 221.

Circuit arrangement 221 produces a transmitter on/off control signal that is high to define a command to turn transmitter 1 on, and is low to define a command to turn transmitter 1 off. If the potential on conductor 217 is greater than +1 volt and less that +2 volts, then the transmitter on/off control signal is high; otherwise, it is low.

The circuitry within circuit arrangement 221 includes a resistor divider network comprising resistors 223, 225 and 227, and a pair or comparators, 229 and 231. Comparators 229 and 231 have open collector outputs that are wire-ANDed together.

The resistance values of resistors 223, 225, and 227 are selected so that the potential at the inverting input of comparator 231 is +1 volt and the potential at the non-inverting input of comparator 229 is +2 volts. A capacitor 223 is provided to cooperate with resistor 219 in defining a low pass noise-rejecting filter.

As to circuitry for controlling transmitter 2, there is provided a circuit arrange arrangement generally indicated at 235 that is located within electronics housing 75 and that has essentially the same configuration circuit arrangement 221. The resistor divider network for circuit arrangement 235 applies a potential of +2 volts to the inverting input of a comparator 237, and a potential of +4 volts to the non-inverting input of a comparator 239.

Figure 20:
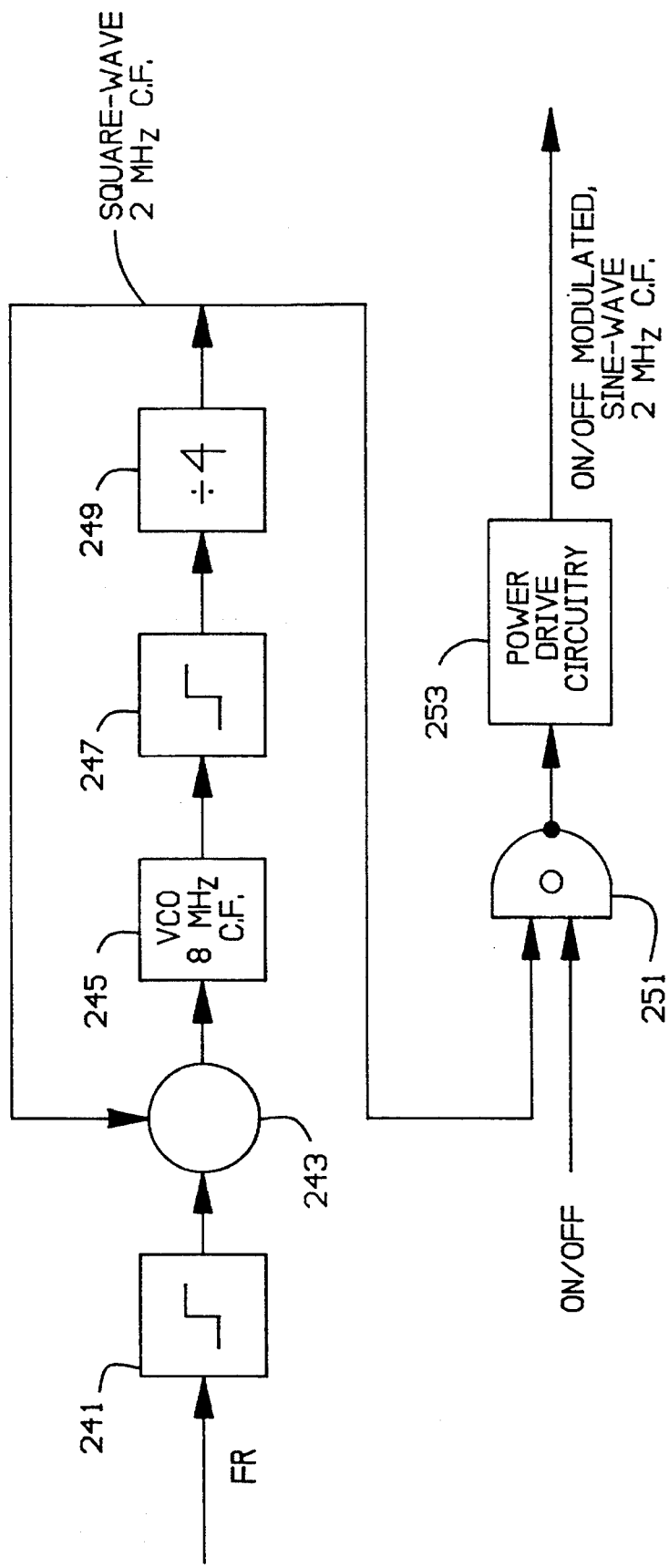
FIG. 20 is a block diagram of the drive circuitry of FIG. 18.

Reference is now made to FIG. 20. The overall function of the circuitry shown in block diagram form in FIG. 20 is to provide an oscillating transmitter-drive signal that is coupled to a transmitting antenna coil. The oscillating transmitter-drive signal is a generally square-wave modulated sine wave, and is produced by a closed loop arrangement such that the frequency of the sine wave is an exact multiple of the FR signal; the center frequency of the sine wave is 2 Mhz. A buffer circuit 241 responds to the FR signal to provide a square-wave input signal to a circuit that defines a phase comparator 243. A suitable integrated circuit for implementing the function of phase comparator 243 is manufactured and sold by Motorola and other companies under the designation MC 14568.

This phase comparator circuit produces an analog phase error signal that is applied to a conventional voltage controlled oscillator (VCO) circuit 245 that includes an 8 Mhz crystal that establishes the center frequency of oscillation of VCO 245. A conventional Schmitt trigger circuit 247 responds to the output of VCO 245 to apply a square-wave signal to a divide-by-four circuit 249. The output signal of circuit 249 is a square-wave having a 2 Mhz center frequency; it is fed back to phase comparator circuit 249 to define a phase lock loop, and it is also applied to one input of a NAND gate 251. The other input of NAND gate 251 responds to a respective one of the transmitter on/off control signals described above with reference to FIG. 19. Conventional power driver circuitry 253 responds to the output of NAND gate 251 to produce the generally square-wave modulated 2 Mhz sine-wave signal that is coupled to a transmitting antenna coil.

Figure 21:
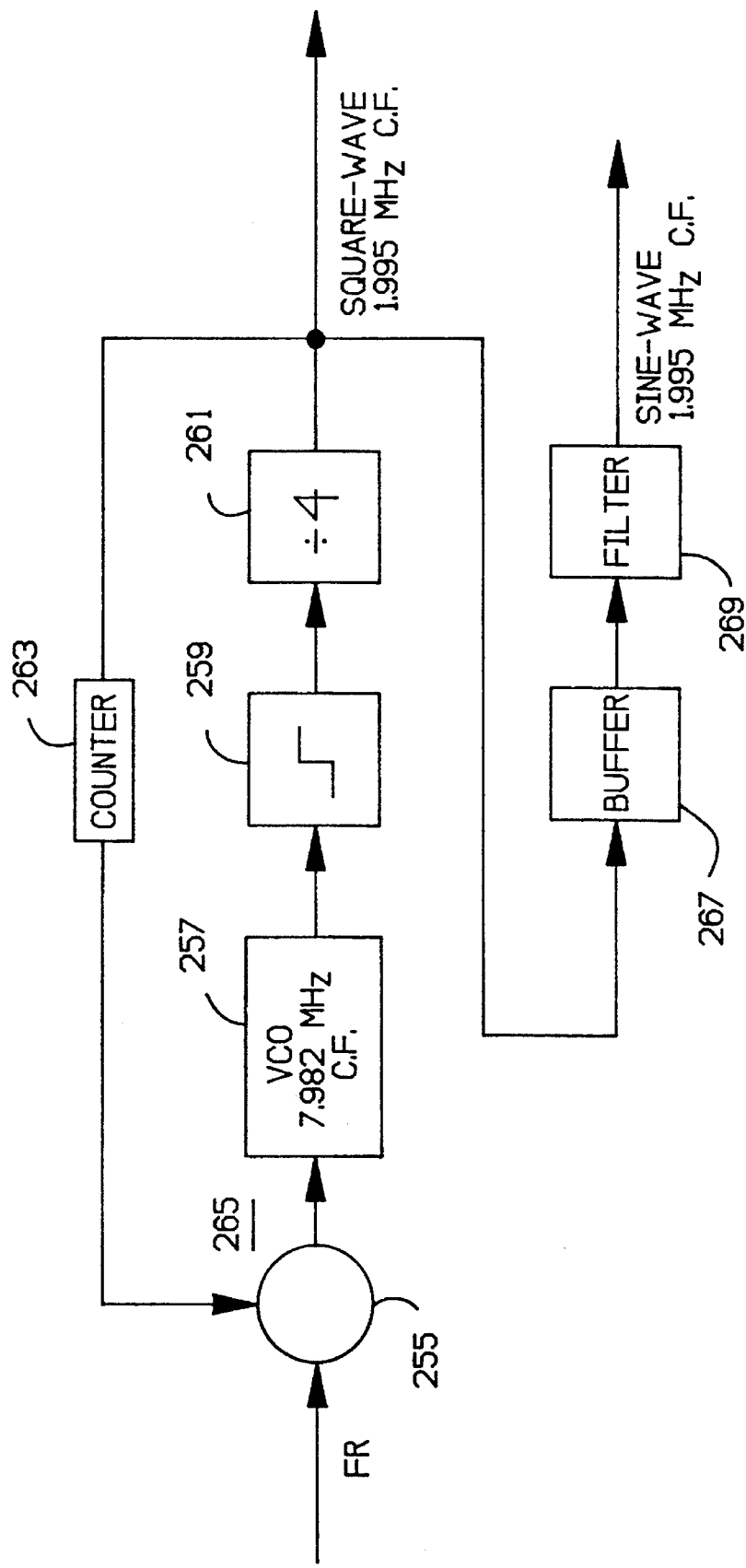
FIG. 21 is a block diagram of a phase-locked local oscillator signal generator of the receiving circuitry of FIG. 18.

Reference is now made to FIG. 21. The overall function of the circuitry shown in block diagram form in FIG. 21 is to produce a phase-looked sine-wave signal with a center frequency of 1.995 Mhz, that is used a s local oscillator signal by receiving circuitry located in electronics housing 73. The FR signal is applied to a phase comparator circuit 255 that suitably is implemented by the same integrated circuit used to implement phase comparator 243 as described above with reference to FIG. 20. The output of phase comparator circuit 255 is applied to a conventional voltage controlled oscillator (VCO) circuit 257 that includes a 7.982 Mhz crystal that establishes the center frequency of oscillation of VCO 257. The output of VCO 257 is applied to a conventional Schmitt trigger circuit 259 that drives a divide-by-four counter 261. The output of divide-by-four counter 261 is a square wave having a center frequency of 1.995 Mhz. This signal is applied to a counter circuit 263 which forms part of a feedback path of a phase lock loop generally indicated at 265. Suitably, counter 263 is implemented by an integrated circuit manufactured and sold by Motorola and other companies under the designation MC 14569. A buffer circuit 267 responds to the 1.995 Mhz square wave and drives a conventional band pass filter circuit 269 which produces a 1.995 Mhz sine wave that is used as a local oscillator signal.

Figure 22A:
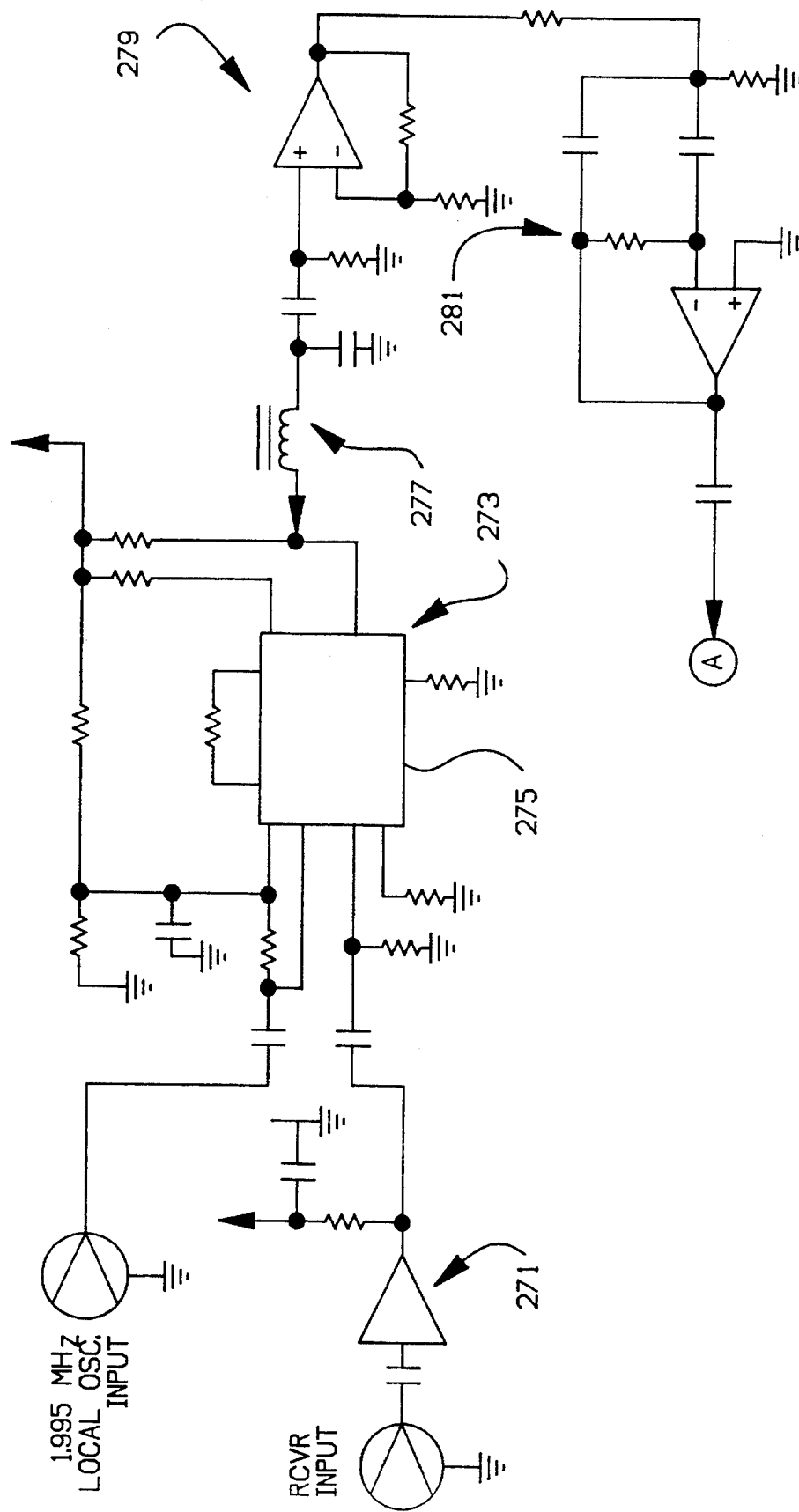
FIG. 22 is a block and schematic diagram of signal processing circuitry of FIG. 18.
Figure 22B:
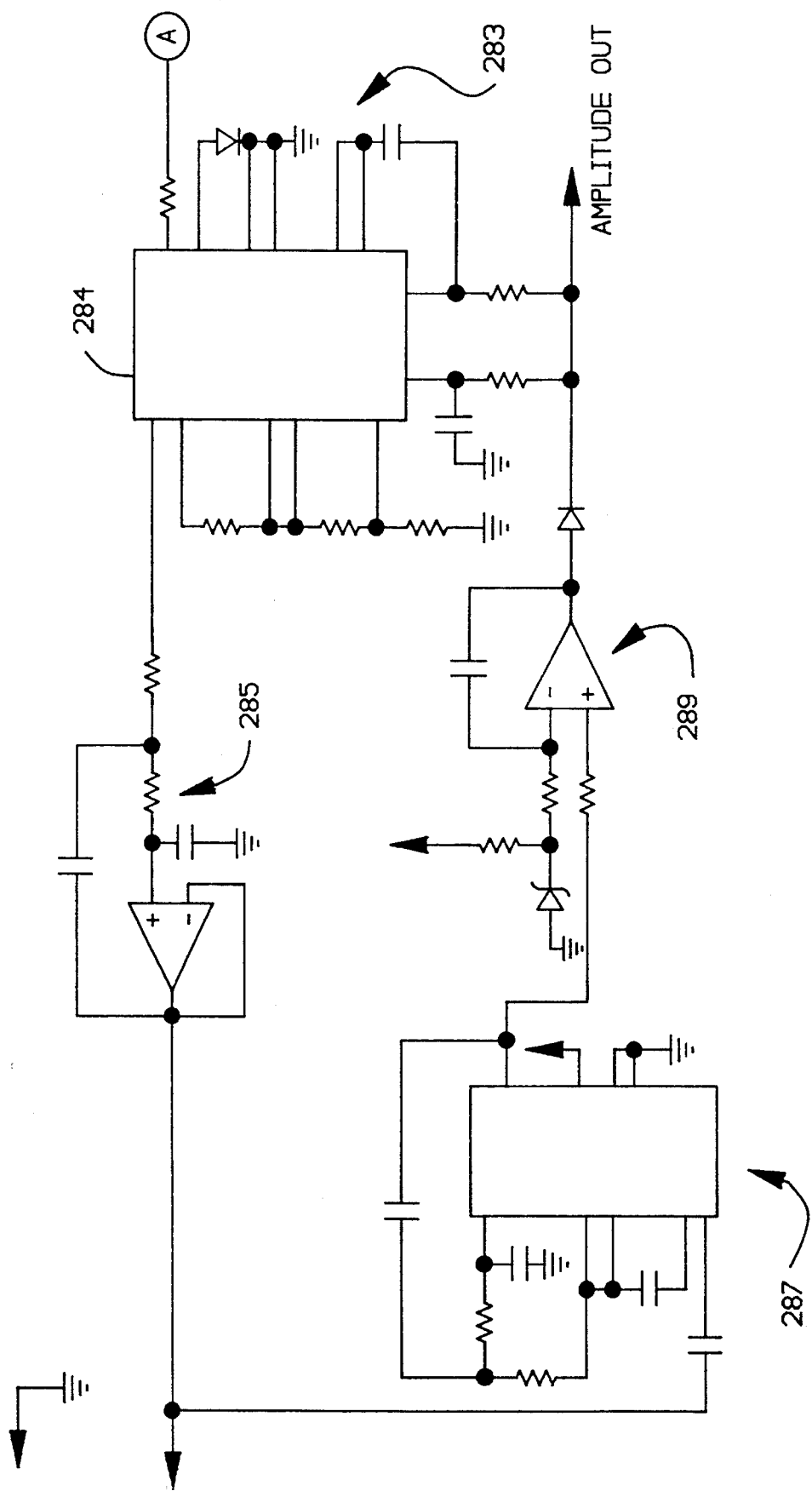

Reference is now made to FIG. 22. The overall function of the circuitry depicted in block diagram and schematic form in FIG. 22 is to respond to the local oscillator signal and one of the two receiver coil output signals to produce a receiver phase output signal and a receiver amplitude output signal. A conventional pre-amp circuit generally indicated at 271 responds to the receiver pick-up signal and its output is applied to a mixer circuit arrangement generally indicated at 273. Mixer circuit arrangement 273 includes an integrated circuit 275 that suitably is implemented by an integrated circuit manufactured and sold by Motorola and other companies under the designation MC 1596.

Because the frequency of the pick-up signal and the local oscillator signals are phase-locked to a common frequency reference and differ by 5 Khz, the intermediate frequency (IF) produced by mixer circuit arrangement 273 is at 5 Khz. A band pass tuning circuit arrangement generally indicated at 277 passes the 5 Khz IF signal to an amplifier circuit arrangement generally indicated at 279. An active band pass filter circuit arrangement generally indicated at 281 provides further band pass filtering and provides a signal to an analog divider circuit arrangement generally indicated at 283 that includes an integrated circuit analog computational unit 284. A suitable integrated circuit analog computational unit is sold by Analog Devices under the designation AD538. Divider 283 is part of an AGC loop arrangement which includes an active low pass filter generally indicated at 285 and RMS-To-DC converter arrangement generally indicated at 287 and an integrating active filter generally indicated at 289 which produces a feedback signal to multiplier circuit arrangement 283.

Figure 23A:
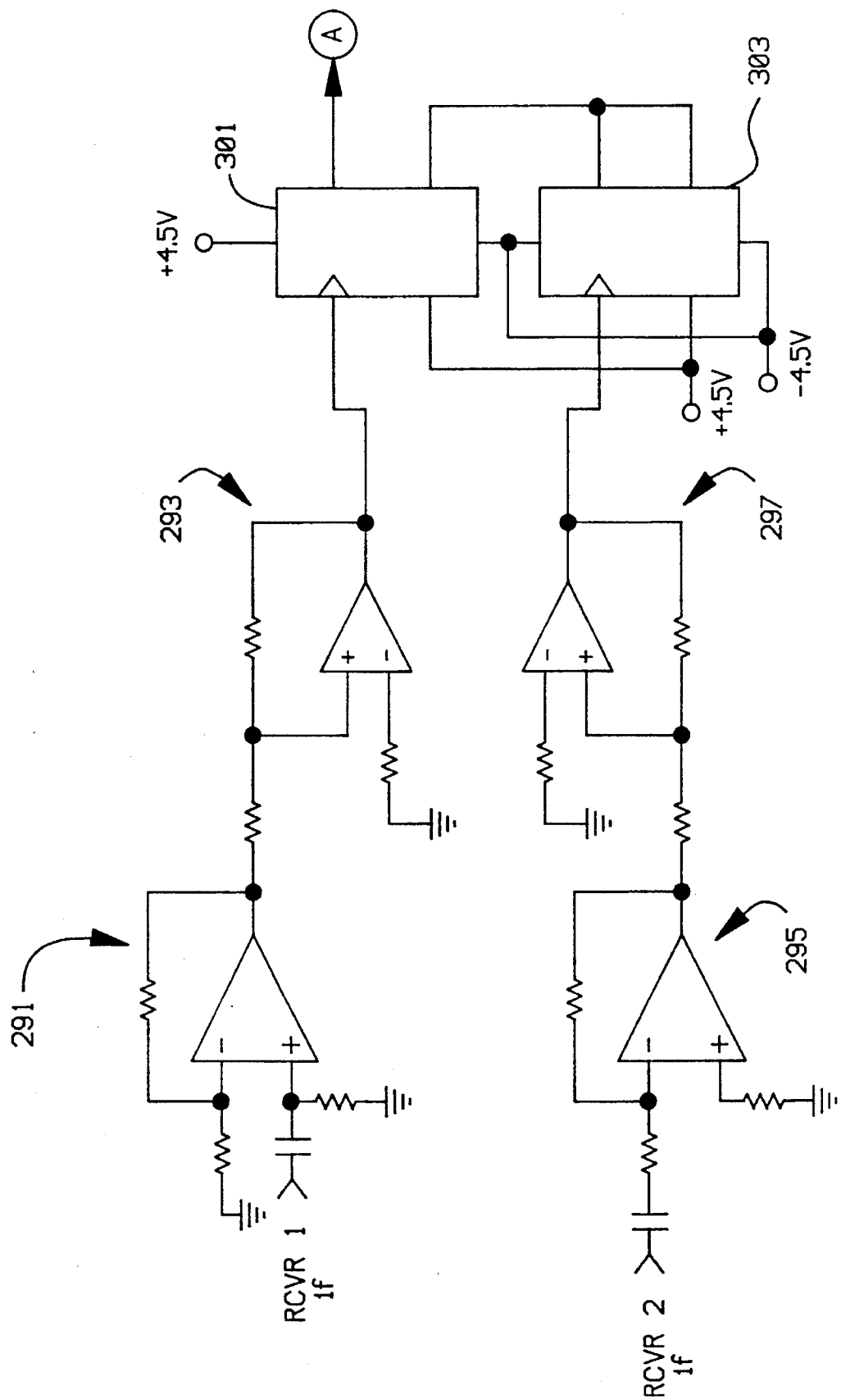
FIG. 23 is a block and schematic diagram of the signal processor circuitry that responds to the circuitry of FIG. 22.
Figure 23B:
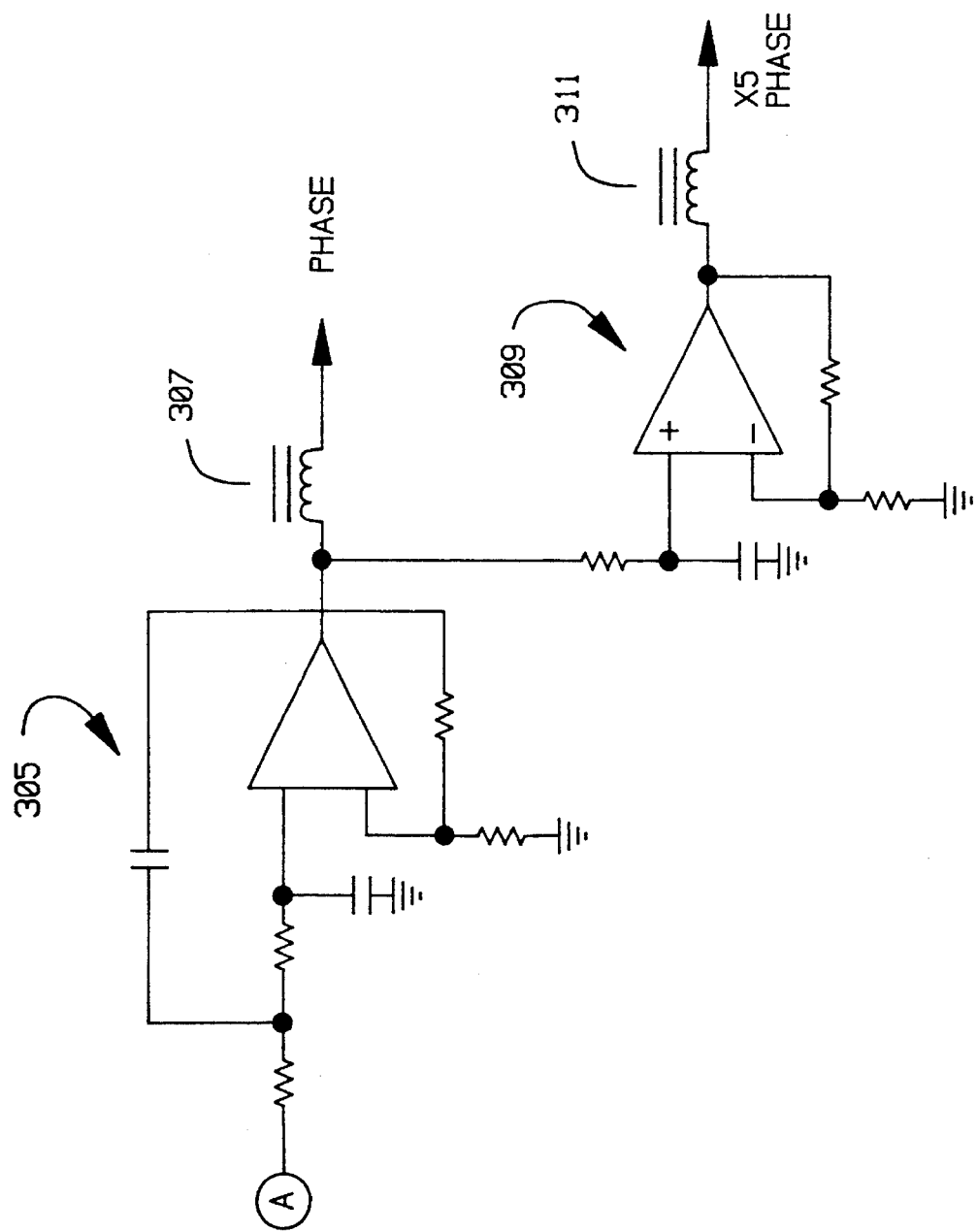
Figure 23C:
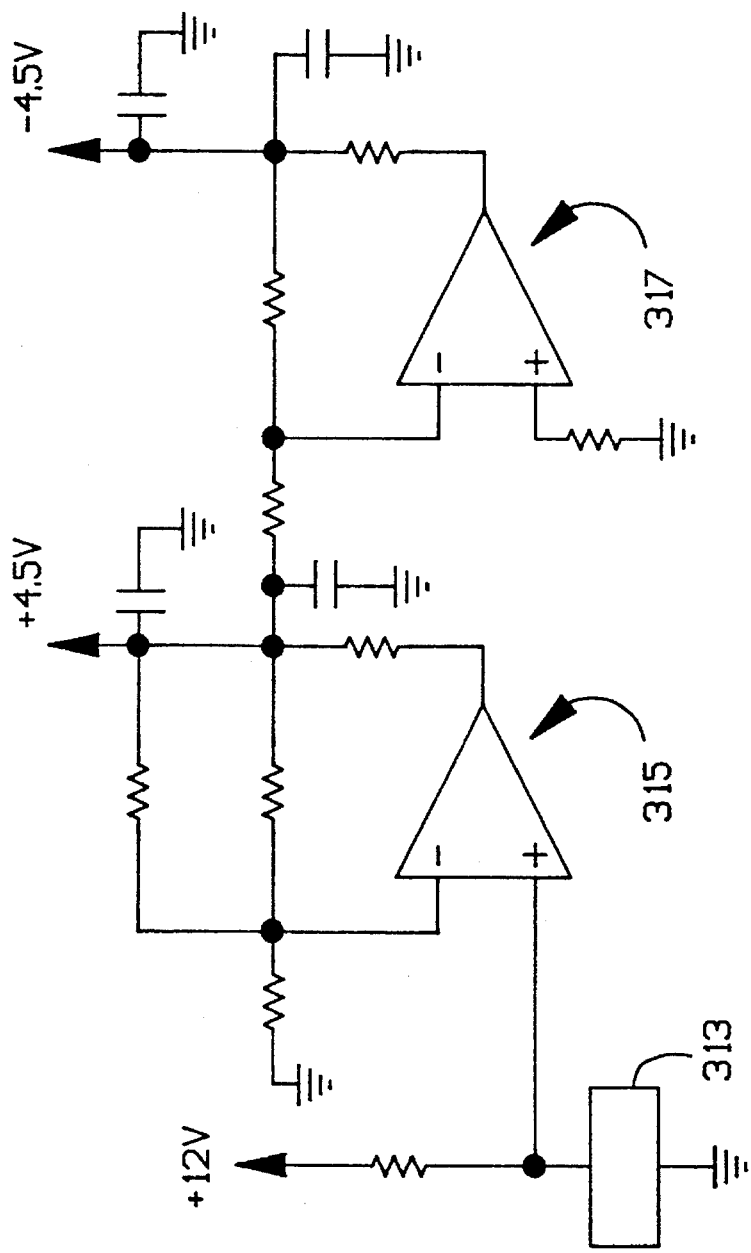

With reference to FIG. 23, there will now be described circuitry performing the overall function of responding to the first and second receiver IF signals to produce two phase-representing analog signals having different scale factors.

An amplifier circuit generally indicated at 291 and a Schmitt trigger circuit generally indicated 293 are connected in tandem to convert the receiver 1 IF signal into a square wave that is in phase with the receiver 1 IF signal. An amplifier circuit generally indicated at 295 and a Schmitt trigger generally indicated at 297 are connected in tandem to convert the receiver 2 IF signal into a square wave signal that is 180 degrees out of phase with respect to the receiver 2 IF signal.

A pair of D-type flip flops 301 and 303 are interconnected in a conventional manner to define a phase detector that produces a pulse width modulated (PWM) signal. An integrating circuit generally indicated at 305 cooperates with a filter choke 307 to convert a PWM signal to an analog phase-representing signal designated as "PHASE" in FIG. 23. The PHASE signal has a scale factor such that a peak voltage of +5 volts represents a 100° phase difference.

A non-inverting amplifier generally indicated at 309 and a filter choke 311 cooperate to produce another phase representing analog control signal designated in FIG. 23 as "x5 PHASE". The x5 PHASE signal has scale factor such that a peak voltage of +5 volts represents a 20° phase difference.

The positive and negative supply voltages of +4.5 volts and −4.5 volts for flip flops 301 and 303 are derived from the +12 volt and −12 volt supplies. In this regard, an integrated circuit voltage reference 313 establishes a reference potential that is stable with temperature. Suitably integrated circuit 313 is an LM135 sold by National Semiconductor and others. The temperature-stable voltage reference is applied to a non-inverting amplifier generally indicated at 315 which produces the +4.5 volt supply voltage. An inverting amplifier generally indicated at 319 produces the −4.5 volt supply voltage.

Flip flop 301 is triggered into its set state on each positive edge in the square wave signal produced by Schmitt trigger 293. While flip flop 301 is in its set state, the PWM signal is at a potential of about +4.5 volts. Flip flop 303 is triggered into its set state when each positive edge in the square wave signal is produced by Schmitt trigger 297. The Q output of flip flop 303 is connected to its reset (R) input and to the reset (R) input of flip flop 301. Thus, upon being triggered into its set state, flip flop 303 immediately resets itself and also resets flip flop 301. While flip flop 301 is in its reset state, the PWM signal is at a potential of about −4.5 volts.

In circumstances in which the receiver 1 IF signal and the receiver 2 IF signal are exactly in phase with each other, the PWM signal is a square wave with an amplitude of ±4.5 volts. Thus, in such circumstances, the phase signal is produced by integrating the square wave to 0 volts.

In circumstances in which the receiver 1 IF signal leads the receiver 2 IF signal, the PWM signal has a wave form involving positive pulse and a negative pulse, with the negative pulse being wider than the positive pulse. In circumstances in which the receiver 1 IF signal lags the receiver 2 IF signal, the PWM signal has a wave form involving a positive pulse which is wider than the negative pulse. The integrated signal is either case has magnitude that is proportional to the difference in phase between the two IF signals, and a sign that indicated which one leads the other.

As indicated in FIG. 18, data processing circuitry 173 is responsive to the phase signals produced by receiving circuitry 169. Data processing circuitry 173 includes conventional memory means for storing sampled data provided in the sequential operation involved in alternately transmitting form the first transmitting circuit means and the second transmitting antenna means. As explained at the outset of this detailed description, the difference between the phases that are alternately measured constitutes data from which formation resistivity can be inferred without errors attributable to certain system tolerances or variations.

Suitably, data processing circuitry 173 computes values of formation resistivity and communicates the computed values to the surface via mud pulse telemetry techniques.

The following discussion illustrates how the dual transmitter, dual receiver measurement-while-drilling apparatus of the present invention is utilized to derive an accurate measure of the amplitude attenuation and phase shift of the interrogating electromagnetic signal which travels through the borehole and surrounding formation.

First, consider four transmitter-to-receiver signals:

(Transmitter 1 [X1] to Receiver 1 [R1]): $A_{11}e^{i}\phi 11$
(Transmitter 1 [X1] to Receiver 2 [R2]): $A_{12}e^{i}\phi 12$
(Transmitter 2 [X2] to Receiver 1 [R1]): $A_{21}e^{i}\phi 21$
(Transmitter 2 [X2] to Receiver 2 [R2]): $A_{22}e^{i}\phi 22$ The measured amplitudes are made up of:

$$A_{mn} = X_m R_n a_{tmn} \qquad \text{(Eq. 1.1)}$$

where $X_m$=transmitter output variation $R_n$=receiver sensitivity variation $a_{tmn}$=true amplitude (transmitter M to receiver N);

and the measured phases are made up of:

$$\phi_{mn} = \phi_{Xm} + \phi_{Rn} + \phi_{tmn} \qquad \text{(Eq. 1.2)}$$

where $\phi Xm$=transmitter phase (output) variation $\phi_{Rn}$=receiver phase variation $\phi_{tmn}$=true phase (transmitter M to receiver N)

The foregoing general equations correspond to the following more specific equations:

$A_{11} = X_1 R_1 a_{t11}$ $A_{12} = X_1 R_2 a_{t12}$ $A_{21} = X_2 R_1 \, a_{t21}$ $A_{22} = X_2 R_2 a_{t22}$ $\phi_{11} = \phi_{X1} + \phi_{R1} + \phi_{t11}$ $\phi_{12} = \phi_{X1} + \phi_{R2} + \phi_{t12}$ $\phi_{21} = \phi_{X2} + \phi_{R1} + \phi_{t21}$ $\phi_{22} = \phi_{X2} + \phi_{R2} + \phi_{t22}$ Taking rations of the various transmitter-to-receiver signals produces the following:
For Transmitter 1:

$$\frac{A_{12} e^{i\phi_{12}}}{A_{11} e^{i\phi_{11}}} = \frac{A^{12}}{A_{11}} e^{i(\phi_{12}-\phi_{11})}$$

and for Transmitter 2:

$$\frac{A_{21} e^{i\phi_{21}}}{A_{22} e^{i\phi_{22}}} = \frac{A^{21}}{A_{22}} * e^{i(\phi_{21}-\phi_{22})}$$

Multiplying these and taking the square root gives:

$$\sqrt{\frac{A_{12}}{A_{11}} * e^{i(\phi_{12}-\phi_{11})} * \frac{A_{21}}{A_{22}} * e^{i(\phi_{21}-\phi_{22})}}$$

$$\sqrt{\frac{A_{12} * A_{21}}{A_{11} * A_{22}}} \; e^{i 1/2(\phi_{12}+\phi_{21}-\phi_{11}-\phi_{22})}$$

Straightforward algebraic manipulation of Eqs. 1.1 through 1.3 yields:
because all the system variables drop out of the measurement.

$$\sqrt{\frac{a_{t12} * a_{t21}}{a_{t11} * a_{t22}}} * e^{i 1/2(\phi_{t12}+\phi_{t21}-\phi_{t11}-\phi_{t22})}$$

Therefore, by using two transmitters and two receivers, systematic variables can be removed from both the attenuation (amplitude) and from the phase velocity (phase difference) terms.

Within the context of the preferred embodiment of this invention, in which a sampled-data processing means produces a signal as a function of formation resistivity based on phase-representing signals, the following analysis demonstrates certain matter relevant to the stability feature.

Consider two consecutive samples: Sample A and Sample B.

During Sample A, a first transmitting coil is energized to cause a wave to propagate through the formation in a direction such that the wave passes a first receiving coil (R1), and later passes a second receiving coil (R2), and induces each receiver coil to produce a signal.

During Sample B, a second transmitting coil is energized to cause a wave to propagate through the formation in a direction such that the wave passes a second receiving coil (R2), and later passes the first receiving coil (R1), and induces each receiver coil to produce a signal.

Let $\phi MR2A$ represent the measured phase of the signal produced by receiver coil R2 during Sample A; let $\phi MR1A$ represent the measured phase of the signal produced by receiver coil R1 during Sample A; let $\phi MR1B$ represent the measured phase of the signal produced by receiver coil R1 during Sample B; and let $\phi MR2B$ represent the measured phase of the signal produced by receiver coil R2 during Sample B.

The $\phi MR2A$ signal depends on the phase of the wave at the location of R2, and in general, has an error component attributable to various phase shifts including those introduced by the tuned receiver coil, cabling from the receiver coil to the receiver, and the receiver itself. Let $\phi TR2A$ represent the true phase of the wave at the location or R2 during Sample A, and let $\phi R2E$ represent the error component so introduced. Eq. 2.1: $\phi MR2A = \phi TR2A + \phi R2E$ Similarly, the $\phi MR1A$ signal depends on the phase of the wave at the location or R1, and in general, has its own error component. Let $\phi TR1A$ represent the true phase of the wave at the location of R1 during Sample A, and let $\phi R1E$ represent the error component so introduced. Eq. 2.2: $\phi MR1A = \phi TR1A + \phi R1E$ During Sample A, the $\phi MR1A$ signal and the $\phi MR2A$ are simultaneously processed to produce a DeltaA signal that represents the difference in phase between these two signals (i.e., $\phi MR1a - \phi MR2A$). Eq. 2.3: Delta $A = (\phi TR2A - \phi TR1A) + (\phi R2E - \phi R1E)$ The component of the DeltaA signal representing the true phase difference ($\phi TR2A - \phi TR1A$) is a function of the resistivity of the formation in the region between the two receiver coils. Let F(rho) represent this component.

$$\text{Delta}A = F(\text{rho}) + (\phi R2E - \phi R1E) \qquad \text{Eq. 2.4}$$

Similarly, during Sample B, the $\phi MR2B$ signal and the $\phi MR1B$ are simultaneously processed to produce a DeltaB signal that represents the difference in phase between these two signals (i.e., $\phi MR2B - \phi MR1B$).

$$\phi MR1B = \phi TR1B + \phi R1E \qquad \text{Eq. 2.5}$$

$$\phi MR2B = \phi TR2B + \phi R2E \qquad \text{Eq. 2.6}$$

$$\text{Delta}B = (\phi TR1B - \phi TR2B) + (\phi R1E - \phi R2E) \qquad \text{Eq. 2.7}$$

The component of the DeltaB signal representing the true phase difference ($\phi TR1B - \phi TR2B$) is a function of the resistivity of the formation in the region between the two receiver coils; i.e., it equals f(rho).

$$\text{Delta}B = f(\text{rho}) + (\phi R1E - \phi R2E) \qquad \text{Eq. 2.8}$$

The Delta A signal is recorded so that it can be retrieved and processed with the Delta B signal.

By adding Equations 2.7 and 2.8, it follows that:

$$\text{Delta}A + \text{Delta}B = 2 * f(\text{rho}) + \phi R2E - \phi R1E - \phi R2E + \phi R1E$$

and $$f(\text{rho}) = \frac{1}{2} * (\text{Delta}A + \text{Delta}B) \qquad \text{Eq. 2.9}$$

In other words, a computed signal representing the sum of the consecutive samples is a function of formation resistivity, and error components such as $\phi R1E$ and $\phi R2E$ do not introduce errors into this computed signal.

While the invention has been shown in only one of its forms, it is not thus limited but is susceptible to various changes and modifications without departing from the spirit thereof.

What is claimed is:

1. An antenna assembly for use in a wellbore for communicating electromagnetic energy, comprising:
   an elongated member with an outer peripheral surface having a contoured portion including a plurality of discrete communication regions of reduced radial dimension and a plurality of land members having a radial dimension substantially equivalent to said outer peripheral surface of said elongated member, with said plurality of discrete communication regions and said plurality of land members being located to define a plurality of alternating groove and land portions;

an antenna pathway defined in said elongated member substantially transverse to said plurality of alternating groove and land portions; and an antenna member at least partially disposed in said antenna pathway with portions of said antenna member extending out of said elongated member at said plurality of discrete communication regions to facilitate communication of said electromagnetic energy, and extending into said elongated member at said plurality of land members.

2. An antenna assembly, according to claim 1, wherein said antenna assembly is operable in at least one of the following modes of operation:

a reception mode of operation wherein said antenna member detects electromagnetic energy in said wellbore and generates a current corresponding thereto; and a transmission mode of operation, wherein said antenna member emits electromagnetic energy in said wellbore in response to an energizing current.

3. An antenna assembly according to claim 1:

wherein said elongated member comprises a substantially cylindrical member; and wherein said antenna pathway is substantially circular in shape.

4. An antenna assembly according to claim 1:

wherein said plurality of discrete communication regions are circumferentially disposed about said elongated member.

5. An antenna assembly according to claim 1, further including:

means for preferentially communicating said electromagnetic energy with particular ones of said portions of said antenna member which are disposed in said plurality of discrete communication regions.

6. An antenna assembly for use in a wellbore for communicating electromagnetic energy, comprising:

an elongated member;

an antenna pathway defined in said elongated member;

an antenna member at least partially disposed in said antenna pathway with portions of said antenna member defining a plurality of discrete communication regions to facilitate communication of said electromagnetic energy; and a plurality of electrically-operable magnetic circuit elements, communicating with particular ones of said plurality of discrete communication regions of said antenna member, for altering antenna gain in response to at least one control signal.

7. An antenna assembly, according to claim 6, wherein said antenna assembly is operable in at least one of the following modes of operation:

a reception mode of operation wherein said antenna member detects electromagnetic energy in said wellbore and generates a current corresponding thereto; and a transmission mode of operation, wherein said antenna member emits electromagnetic energy in said wellbore in response to an energizing current.

8. An antenna assembly according to claim 6, further comprising:

a controller member for providing said at least one control signal to said plurality of electrically-operable magnetic circuit elements to alter said antenna gain in a predetermined manner in response to programmed controller instructions.

9. An antenna assembly according to claim 8, wherein said antenna gain is altered by providing a difference in antenna gain for particular ones of said plurality of discrete communication regions of said antenna member.

10. An antenna assembly according to claim 9, wherein said antenna gain may be altered to obtain at least one of the following:

(a) an azimuthally-balanced antenna gain;

(b) an azimuthally-imbalanced antenna gain.

11. An antenna assembly, for use in a drillstring in a measurement-while-drilling system, during drilling operations to interrogate a borehole and surrounding formation, utilizing electromagnetic energy comprising:

a tubular member for coupling in a selected position within said drillstring during drilling operations, said tubular member including (a) an inner peripheral surface defining a central bore (b) an outer peripheral surface, and (c) a tubular body defined therebetween;

an antenna pathway defined in said tubular body of said tubular member;

an antenna member at least partially disposed in said antenna pathway;

wherein said tubular member includes a contoured portion which defines a plurality of interleaved groove regions having a reduced radial dimension and land regions formed in said tubular body; and wherein said antenna pathway traverses said plurality of interleaved groove regions and land regions of said contoured portion; and wherein said antenna member extends out of said tubular body of said tubular member at each of said plurality of groove regions to facilitate communication of said electromagnetic energy between said antenna member and said borehole and surrounding formation and passes into said plurality of land regions.

12. An antenna assembly according to claim 11, wherein said tubular member is formed of a material which substantially impedes communication of said electromagnetic energy between said antenna member and said borehole and surrounding formation.

13. An antenna assembly according to claim 11, wherein said tubular member includes threaded ends for coupling in said drillstring.

14. An antenna assembly according to claim 11, wherein said antenna pathway is substantially circular in configuration.

15. An antenna assembly according to claim 11, wherein said antenna pathway is positioned intermediate said inner peripheral surface and said outer peripheral surface, except for portions of said antenna member which pass through said plurality of groove regions of said contoured portion of said tubular member.

16. An antenna assembly according to claim 11, wherein said antenna pathway is substantially transverse to a longitudinal axis of said tubular member.

17. An antenna assembly according to claim 11, wherein said antenna member includes at least one antenna coil which is tuned to a particular electromagnetic energy frequency.

18. An antenna assembly according to claim 18, wherein each of said at least one antenna coil comprises a single loop antenna coil.

19. An antenna assembly according to claim 17, wherein said antenna member includes a plurality of antenna coils, each of which is tuned to a particular electromagnetic frequence.

20. An antenna assembly according to claim 11, wherein said contoured portion extends circumferentially about said tubular member at a particular axial position.

21. An antenna assembly according to claim 20, wherein each of said plurality of groove regions is located at a preselected azimuthal location on said tubular member.

22. An antenna assembly according to claim 11, wherein each of said plurality of groove regions comprises an axial slot formed in said tubular member.

23. An antenna assembly according to claim 11, wherein said contoured portion of said member defines in said tubular member a region of alternating grooves and lands, with said antenna pathway extending through said ridges and across said grooves.

24. An antenna assembly according to claim 23, wherein said grooves are filled with material which is more transmissive of said electromagnetic energy than said lands to facilitate communication of said electromagnetic energy between said antenna member and said borehole and surrounding formation.

25. An antenna assembly according to claim 23, wherein said grooves are filled with material which has a magnetic permeability greater than one.

26. An antenna assembly according to claim 23, wherein said grooves are filled with material which has a resistivity which is much greater than that of material from which said tubular member is formed.

27. An antenna assembly according to claim 23, wherein said grooves are filled with material which includes (a) a resistivity attribute which is determined with respect to said tubular member, and (b) a permeability attribute which is determined with respect to said tubular member and said borehole and surrounding formation.

28. An antenna assembly according to claim 23, wherein said grooves comprise semicircular slots generally aligned with a longitudinal axis of said tubular member.

29. An antenna assembly according to claim 11, wherein said interrogation regions are disposed about said tubular member to provide for symmetrical communication of electromagnetic energy between said antenna member and said borehole and surrounding formation.

30. An antenna assembly according to claim 11, wherein said interrogation regions are disposed about said tubular member to provide for asymmetrical communication of electromagnetic energy between said antenna member and said borehole and surrounding formation.

31. An antenna assembly according to claim 11, wherein said interrogation regions are azimuthally disposed about said tubular member to provide for an azimuthally-balanced communication of electromagnetic energy between said antenna member and said borehole and surrounding formation.

32. An antenna assembly according to claim 11, wherein said interrogation regions are azimuthally disposed about said tubular member to provide for an azimuthally-imbalanced communication of electromagnetic energy between said antenna member and said borehole and said surrounding formation.

33. An antenna assembly according to claim 11, further comprising:
a filler material, positionable within at least a portion of particular ones of said interrogation regions of said contoured portion of said tubular member, which has a magnetic reluctance which differs from that of said tubular member, for boosting communication of said electromagnetic energy at particular ones of said plurality of interrogation regions over others of said plurality of interrogation regions.

34. An antenna assembly according to claim 33, wherein said filler material comprises a magnetically-permeable material with a comparatively high magnetic permeability, which provides a region of relatively low reluctance to the passage of electromagnetic energy.

35. An antenna assembly according to claim 33, wherein said filler material is disposed in particular ones of said plurality of interrogation regions to ensure symmetrical communication of electromagnetic energy between said antenna member and said borehole and surrounding formation.

36. An antenna assembly according to claim 33, wherein said filler material is disposed in particular ones of said plurality of interrogation regions to ensure asymmetrical communication of electromagnetic energy between said antenna member and said borehole and surrounding formation.

37. An antenna assembly according to claim 33, wherein said filler material is disposed in particular ones of said plurality of interrogation regions to ensure an azimuthally-balanced communication of electromagnetic energy between said antenna member and said borehole and surrounding formation.

38. An antenna assembly according to claim 33, wherein said filler material is disposed in particular ones of said plurality of interrogation regions to ensure an azimuthally-imbalanced communication of electromagnetic energy between said antenna member and said borehole and surrounding formation.

39. An antenna assembly according to claim 11, wherein symmetrical communication of said electromagnetic energy between said antenna member and said borehole and surrounding formation is ensured, by inclusion in said antenna assembly of at least one of:

(1) positioning said plurality of interrogation regions of said contoured portion in a particular position about said tubular member; and (2) placing a filler material, which has a magnetic reluctance which differs from that of said tubular member, within at least a portion of particular ones of said plurality of interrogation regions to boost communication of said electromagnetic energy at particular ones of said plurality of interrogation regions over others of said plurality of interrogation regions.

40. An antenna assembly according to claim 39, wherein said symmetrical communication of said electromagnetic energy between said antenna member and said borehole and surrounding formation comprises azimuthally-symmetrical communication between said antenna member and said borehole and surrounding formation.

41. An antenna assembly according to claim 11, wherein asymmetrical communication of said electromagnetic energy between said antenna member and said borehole and surrounding formation is ensured, by inclusion in said antenna assembly of at least one of:

(1) positioning said plurality of interrogation regions of said contoured portion in a particular position about said tubular member; and (2) placing a filler material, which has a magnetic reluctance which differs from that of said tubular member, within at least a portion of particular ones of said plurality of interrogation regions to boost communication of said electromagnetic energy at particular ones of said plurality of interrogation regions over others of said plurality of interrogation regions.

42. An antenna assembly according to claim 41, wherein said asymmetrical communication of said electromagnetic energy between said antenna member and said borehole and surrounding formation comprises azimuthally-asymmetrical communication between said antenna member and said borehole and surrounding formation.

43. An antenna assembly according to claim 11, further comprising:

a filler material, positionable within at least a portion of particular ones of said interrogation regions of said contoured portion of said tubular member, which has a magnetic reluctance which differs from that of said tubular member, for altering communication of said electromagnetic energy at said particular ones of said plurality of interrogation regions; and means for selectably altering said magnetic reluctance of said filler material to shape communication of said electromagnetic energy between said antenna member and said borehole and surrounding formation.

44. An antenna assembly according to claim 43, wherein said means for selectably alternating comprises:

means for selectably altering said magnetic reluctance of said filler material in response to at least one electrical control signal to shape communication of said electromagnetic energy between said antenna member and said borehole and surrounding formation.

45. An antenna assembly according to claim 43, wherein said filler material comprises:

a plurality of filler inserts, each being selectably positionable within a particular one of said interrogation regions, which have a magnetic reluctance which differs from that of said tubular member;

selected ones of said plurality of filler inserts having an electrical winding in flux-transferring communication therewith;

said electrical windings selectably receiving a control current from said means for selectably altering for altering the flux-carrying capacity of said filler inserts.

46. An antenna assembly according to claim 43, wherein said means for selectably altering can be utilized to provide at least one of:

(a) a symmetrical communication of said electromagnetic energy between said antenna member and said borehole and surrounding formation;

(b) an asymmetrical communication of said electromagnetic energy between said antenna member and said borehole and surrounding formation;

(c) an asymmetrical and azimuthally preferential communication of electromagnetic energy between said antenna member and said borehole and surrounding formation; and (d) an asymmetrical and azimuthally preferential communication of electromagnetic energy, for a particular one of a plurality of selectably azimuthal locations, between said antenna member and said borehole and surrounding formation.

47. An improved antenna member for use in a measurement-while-drilling system, during drilling operations in a wellbore, comprising:

a tubular member for coupling in a selected location within a drillstring;

a plurality of axial grooves (1) cut into said tubular member at particular azimuthal locations and (2) defining a plurality of land regions therebetween;

a circular antenna conduit (1) substantially concentric with a central longitudinal axis of said tubular member, (2) extending through each of said plurality of land regions, and (3) communicating with each of said plurality of axial grooves; and an antenna winding extending through said circular antenna conduit for transmitting or receiving electromagnetic radiation at portions of said antenna winding located in said plurality of axial grooves.

48. An improved antenna member according to claim 47, wherein said plurality of land regions include a peripheral portion which is substantially coextensive with an outer peripheral portion of said tubular member.

49. An improved antenna member according to claim 47, wherein said plurality of axial grooves are located at azimuthally equidistant positions along an outer surface of said tubular member.

50. An improved antenna member according to claim 47, wherein said antenna winding comprises a single loop antenna.

51. An improved antenna member according to claim 47, wherein said antenna winding comprises a multiple loop antenna.

52. An improved antenna member according to claim 47:

wherein said improved antenna member is operable in a transmission mode of operation, wherein a field-generating electrical current is directed through said antenna winding to generate a magnetic field with flux lines which are substantially transverse to said antenna winding.

53. An improved antenna member according to claim 47:

wherein said improved antenna member is operable in a reception mode of operation, wherein magnetic field components adjacent said antenna winding which are substantially axial to said tubular member are detected by said antenna winding and generates an electrical signal corresponding thereto.

54. An improved antenna member according to claim 47, wherein said antenna winding is oriented azimuthally perpendicular to said plurality of grooves and said plurality of land regions.

55. A measurement-while-drilling apparatus for use during drilling operations to interrogate a borehole and surrounding formation, comprising;

a transmitting member including at least one transmitting antenna for receiving an energizing electrical current and for selectively generating an interrogating electromagnetic signal for propagation through said borehole and surrounding formation;

a receiving member, spaced apart from said transmitting member, and including at least one receiving antenna for detecting an interrogating electromagnetic signal and generating an electrical current representative thereof;

a signal processing member for identifying at least one characteristic of said interrogating electromagnetic signal which is representative of at least one property of at least one of (1) said borehole, and (2) said surrounding formation;

a tubular member of coupling in a selected position within said drillstring and for supporting said transmitting member, said receiving member, and said signal processing member;

an antenna assembly, for use in at least one (a) said transmitting member, and (b) said receiving member, including:

(1) an antenna pathway, with a plurality of enclosed pathway portions surrounded by said tubular member, and a plurality of open pathway portions with said tubular member only partially surrounding each of said plurality of open pathway portions;

(2) an antenna member disposed in said antenna pathway;

(3) wherein said electromagnetic energy is preferentially communicated between said antenna member and said borehole and surrounding formation at said plurality of open pathway portions in comparison with said plurality of enclosed pathway portions.

56. A measurement-while-drilling apparatus, according to claim 55:

wherein said plurality of open pathway portions are arranged about said tubular member to ensure substantially symmetrical communication of said electromagnetic energy between said antenna member and said borehole and surrounding formation.

57. A measurement-while-drilling apparatus, according to claim 55:

wherein said plurality of open pathway portions are arranged about said tubular member to ensure substantially asymmetrical communication of said electromagnetic energy between said antenna member and said borehole and surrounding formation.

58. A measurement-while-drilling apparatus, according to claim 55:

wherein said plurality of open pathway portions are arranged about said tubular member to ensure substantially azimuthally symmetrical communication of said electromagnetic energy between said antenna member and said borehole and surrounding formation.

59. A measurement-while-drilling apparatus, according to claim 55:

wherein said plurality of open pathway portions are arranged about said tubular member to ensure substantially azimuthally-asymmetrical communication of said electromagnetic energy between said antenna member and said borehole and surrounding formation.

60. A measurement-while-drilling apparatus, according to claim 55, wherein said antenna assembly further includes:

means for preferentially communicating electromagnetic energy between said antenna member and said borehole and surrounding formation at particular ones of said plurality of open pathway portions in comparison with others of said plurality of open pathway portions.

61. A measurement-while-drilling apparatus, according to claim 60:

wherein said means for preferentially communicating is utilized to ensure substantially symmetrical communication of electromagnetic energy between said antenna member and said borehole and surrounding formation.

62. A measurement-while-drilling apparatus, according to claim 60:

wherein said means for preferentially communicating is utilized to ensure substantially asymmetrical communication of electromagnetic energy between said antenna member and said borehole and surrounding formation.

63. A measurement-while-drilling apparatus, according to claim 60:

wherein said means for preferentially communicating is utilized to ensure substantially azimuthally symmetrical communication of electromagnetic energy between said antenna member and said borehole and surrounding formation.

64. A measurement-while-drilling apparatus, according to claim 60:

wherein said means for preferentially communicating is utilized to ensure substantially azimuthally asymmetrical communication of electromagnetic energy between said antenna member and said borehole and surrounding formation.

65. A measurement-while-drilling apparatus, according to claim 60:

wherein said means for preferentially communicating comprises a plurality of booster inserts, composed of a material of comparatively low magnetic reluctance, one of which is placed adjacent said antenna member in selected ones of said plurality of open pathway portions to enhance communication of electromagnetic energy between said antenna member and said borehole and surrounding formation at said selected ones of said plurality of open pathway portions as compared to others of said plurality of open pathway portions.

66. A measurement-while-drilling apparatus according to claim 65, further comprising:

means for altering said magnetic reluctance of said plurality of booster inserts to allow preferential directing of communication of said electromagnetic energy between said antenna and said borehole and surrounding formation.

67. A measurement-while-drilling apparatus, according to claim 66:

wherein said means for altering is operable during drilling operations to allow changes in preferential directing of communication of said electromagnetic energy between said antenna member and said borehole and surrounding formation.

68. A measurement-while-drilling apparatus for use during drilling operations to interrogate a borehole comprising:

a transmitting member including at least one transmitting antenna for receiving an energizing electrical current and for selectively generating an interrogating electromagnetic signal for propagation through said borehole and surrounding formation;

a receiving member, spaced apart from transmitting member, including at least one receiving antenna for detecting said interrogating electromagnetic signal and generating an electrical current representative thereof;

a signal processing member for identifying at least one characteristic of said interrogating electromagnetic signal which is representative of at least one property of at least one of (1) said borehole, and (2) said surrounding formation;

a tubular member of coupling in a selected position within said drillstring and for supporting said transmitting member, said receiving member, and said signal processing member;

an antenna assembly, for use in at least one of (a) said transmitting member, and (2) said receiving member, including:

(1) an antenna pathway at least in part disposed within and surrounded by said tubular member;

(2) an antenna member disposed in said antenna pathway;

focus means for preferentially communicating electromagnetic energy between at least one portion of said antenna member and said borehole and surrounding formation.

69. A measurement-while-drilling apparatus, according to claim 68, wherein said focus means is configurable to allow at least one of:

(a) symmetrical communication of electromagnetic energy between portions of said antenna member and said borehole and surrounding formation;

(b) asymmetrical communication of electromagnetic energy between portions of said antenna member and said borehole and surrounding formation;

(c) azimuthally symmetrical communication of electromagnetic energy between portions of said antenna member and said borehole and surrounding formation;

(d) azimuthally asymmetrical communication of electromagnetic energy between portions of said antenna member and said borehole and surrounding formation;

(e) azimuthally dependent communication of electromagnetic energy between portions of said antenna member and said borehole and surrounding formation.

70. A measurement-while-drilling apparatus, according to claim 68:

wherein said focus means is subject to control by said signal processing member during drilling operations to allow at least one of:

(a) symmetrical communication of electromagnetic energy between portions of said antenna member and said borehole and surrounding formation;

(b) asymmetrical communication of electromagnetic energy between portions of said antenna member and said borehole and surrounding formation;

(c) azimuthally symmetrical communication of electromagnetic energy between portions of said antenna member and said borehole and surrounding formation;

(d) azimuthally asymmetrical communication of electromagnetic energy between portions of said antenna member and said borehole and surrounding formation;

(e) azimuthally dependent communication of electromagnetic energy between portions of said antenna member and said borehole and surrounding formation.

71. A method of interrogating a borehole surrounding a formation with an electromagnetic interrogating field, comprising the method steps of:

providing an elongated member with an antenna pathway defined therein with an antenna member at least partially disposed in said antenna pathway with portions of said antenna member defining a plurality of discrete communication regions;

selectively communicating said electromagnetic interrogating field between said antenna member and said borehole surrounding formation at particular ones of said portions of said antenna member defining a plurality of discrete communication regions.

72. A method of interrogating a borehole and surrounding formation, according to claim 71, further comprising:

providing a programmable controller;

selectively communicating said electromagnetic interrogating field between said antenna member and said borehole and surrounding formation in a particular manner in response to said programmable controller.

* * * * *